(12) United States Patent
Takamura et al.

(10) Patent No.: US 11,863,052 B2
(45) Date of Patent: Jan. 2, 2024

(54) DRIVE DEVICE

(71) Applicant: Nidec Corporation, Kyoto (JP)

(72) Inventors: Kengo Takamura, Kyoto (JP); Hibiki Takada, Kyoto (JP); Shohei Fujimoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/563,437

(22) Filed: Dec. 28, 2021

(65) Prior Publication Data

US 2022/0209625 A1 Jun. 30, 2022

(30) Foreign Application Priority Data

Dec. 28, 2020 (JP) ................................ 2020-218897

(51) Int. Cl.
*H02K 5/20* (2006.01)
*H02K 9/19* (2006.01)
*H02K 7/10* (2006.01)

(52) U.S. Cl.
CPC .............. *H02K 9/19* (2013.01); *H02K 5/20* (2013.01); *H02K 7/10* (2013.01)

(58) Field of Classification Search
CPC .. H02K 9/19; H02K 5/20; H02K 7/10; H02K 5/203
See application file for complete search history.

(56) References Cited

U.S. PATENT DOCUMENTS

| 8,928,195 B2 * | 1/2015 | Ohashi ..................... H02K 9/19 310/58 |
| 2018/0287452 A1 * | 10/2018 | Kim ....................... H02K 11/30 |
| 2019/0173359 A1 * | 6/2019 | Ishikawa .................. H02K 1/32 |

FOREIGN PATENT DOCUMENTS

| JP | 2010-268633 A | 11/2010 |
| JP | 2017-135844 A | 8/2017 |
| JP | 2020-516218 A | 5/2020 |
| KR | 10-2011-0089717 A | 8/2011 |

OTHER PUBLICATIONS

WO 2015174212 A1 (Year: 2015).*
JP-2017135844-A (Year: 2017).*
Official Communication issued in corresponding Chinese Patent Application No. 202111609564.1, dated Aug. 28, 2023.

* cited by examiner

*Primary Examiner* — Dang D Le
(74) *Attorney, Agent, or Firm* — Keating & Bennett, LLP

(57) ABSTRACT

A drive device includes a motor including a rotor rotatable about a central axis, a transmission connected to the motor, and a housing including a motor housing accommodating the motor and a transmission housing accommodating the transmission. A first fluid is accommodated in the transmission housing. The housing includes a first flow path through which the first fluid flows and a second flow path through which the second fluid flows. The first flow path includes a supply flow path that supplies the first fluid in the transmission housing to the inside of the motor housing, and a collection flow path that extends from the inside of the motor housing to the inside of the transmission housing. At least a portion of the second flow path is located radially outside the motor. At least a portion of the collection flow path is located radially outside the second flow path.

14 Claims, 11 Drawing Sheets

DRIVE DEVICE

CROSS-REFERENCE TO RELATED APPLICATIONS

The present application claims priority under 35 U.S.C. § 119 to Japanese Patent Application No. 2020-218897, filed on Dec. 28, 2020, the entire contents of which are hereby incorporated herein by reference.

1. Field of the Invention

The present disclosure relates to a drive device.

2. Background

For example, a structure for cooling a motor of a drive device mounted on a vehicle or the like is known. For example, there is a structure in which a cooling flow path is provided in a housing to cool the motor.

In the drive device as described above, it has been required to further improve the cooling efficiency of the motor.

SUMMARY

An example embodiment of a drive device of the present disclosure includes a motor including a rotor rotatable about a central axis, a transmission connected to the motor, and a housing including a motor housing accommodating the motor therein and a transmission housing accommodating the transmission therein. A first fluid is accommodated in the transmission housing. The housing includes a first flow path through which the first fluid flows and a second flow path through which the second fluid flows. The first flow path includes a supply flow path that supplies the first fluid in the transmission housing to the inside of the motor housing, and a collection flow path that extends from the inside of the motor housing to the inside of the transmission housing. At least a portion of the second flow path is located radially outside the motor. At least a portion of the collection flow path is located radially outside the second flow path.

The above and other elements, features, steps, characteristics and advantages of the present disclosure will become more apparent from the following detailed description of the example embodiments with reference to the attached drawings.

DETAILED DESCRIPTION

Figure 1:
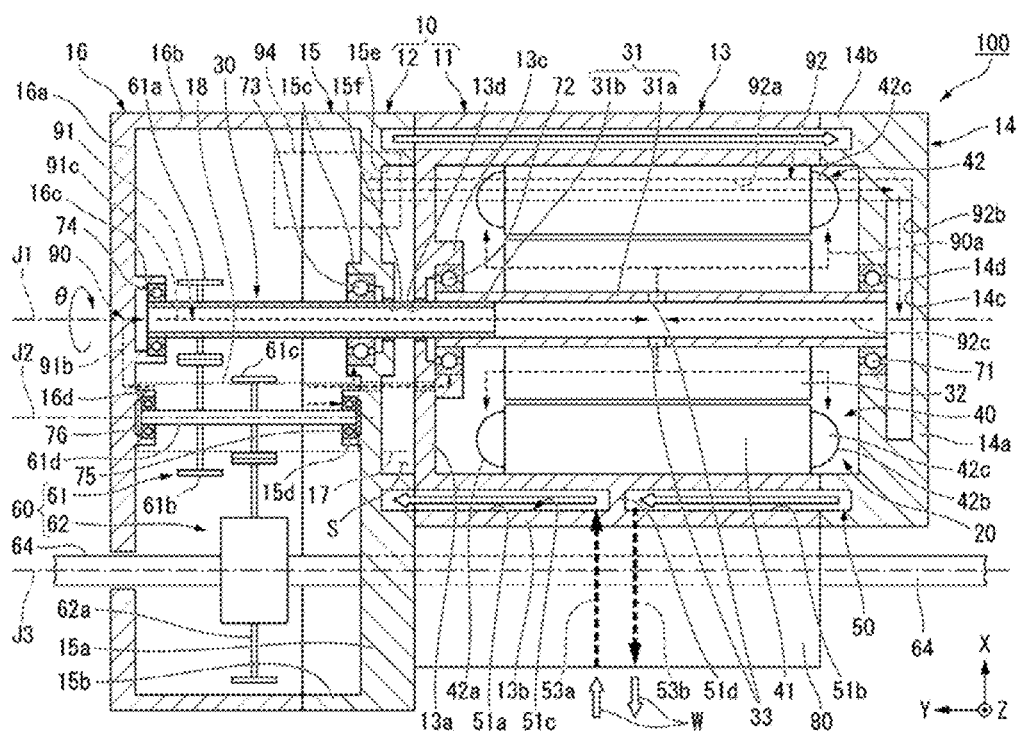
FIG. 1 is a sectional view of a drive device of an example embodiment of the present disclosure as viewed from above.

The following description will be made with a vertical direction being defined on the basis of positional relationships in the case where drive devices according to example embodiments are installed in vehicles located on a horizontal road surface. That is, it is sufficient that the relative positional relationships regarding the vertical direction described in the following example embodiments are satisfied at least in the case where the drive device is installed in the vehicle located on the horizontal road surface.

In the drawings, an xyz coordinate system is illustrated appropriately as a three-dimensional orthogonal coordinate system. In the xyz coordinate system, a z-axis direction corresponds to the vertical direction. A +Z side is an upper side in the vertical direction, and a −Z side is a lower side in the vertical direction. In the following description, the upper side and the lower side in the vertical direction will be referred to simply as the "upper side" and the "lower side", respectively. An x-axis direction corresponds to a front-rear direction of the vehicle in which the drive device is installed, i.e., a direction perpendicular to the z-axis direction. In the example embodiment described below, a +X side corresponds to a forward side in the vehicle, while a −X side corresponds to a rearward side in the vehicle. A Y-axis direction corresponds to a left-right direction of the vehicle, i.e., a width direction of the vehicle, and is a direction perpendicular to both the x-axis direction and the z-axis direction. In the following example embodiments described below, a +Y side corresponds to a left side in the vehicle, while a −Y side corresponds to a right side in the vehicle. Each of the front-rear direction and the left-right direction is a horizontal direction perpendicular to the vertical direction.

Note that the definition of the forward and rearward sides in the front-rear direction is not limited to the definition of the example embodiment described below, and that the +X side and the −X side may correspond to the rearward side and the forward side, respectively, of the vehicle. In this case, the +Y side corresponds to the right side of the vehicle, while the −Y side corresponds to the left side of the vehicle. Further, in the present specification, it is assumed that the term "parallel" as used herein includes both "parallel" and "substantially parallel", and that the term "perpendicular" as used herein includes both "perpendicular" and "substantially perpendicular".

A central axis J1 illustrated in the drawing as appropriate is a virtual axis extending in a direction intersecting the vertical direction. More specifically, the central axis J1 extends in the Y-axis direction perpendicular to the vertical direction, that is, in the left-right direction of the vehicle. In description below, unless otherwise particularly stated, a direction parallel to the central axis J1 is simply referred to as the "axial direction", a radial direction about the central axis J1 is simply referred to as the "radial direction", and a circumferential direction about the central axis J1, that is, a direction around the central axis J1 is simply referred to as the "circumferential direction". In the present example embodiment, the left side (+Y side) corresponds to the "one side in the axial direction", and the right side (−Y side) corresponds to the "other side in the axial direction".

An arrow θ appropriately illustrated in the drawing indicates the circumferential direction. In the following description, a side traveling counterclockwise about the central axis J1 as viewed from one side (+Y side) in the axial direction in the circumferential direction, that is, a side (+θ side) on which the arrow θ faces is referred to as "one side in the circumferential direction", and a side traveling clockwise about the central axis J1 as viewed from one side in the axial direction in the circumferential direction, that is, a side (−θ side) opposite to the side on which the arrow θ faces is referred to as "the other side in the circumferential direction".

Figure 2:
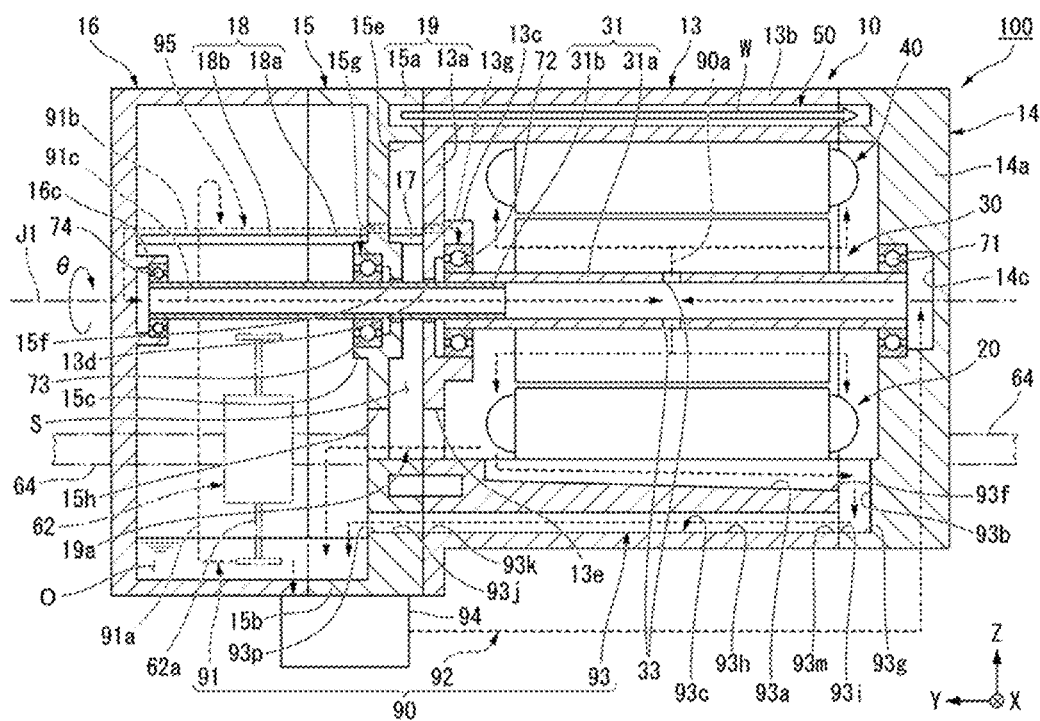
FIG. 2 is a sectional view of the drive device of an example embodiment of the present disclosure as viewed from rear.

A drive device 100 of the present example embodiment illustrated in FIGS. 1 and 2 is a drive device that is mounted on a vehicle and rotates an axle 64. A vehicle mounted on the drive device 100 is a vehicle having a motor such as a hybrid vehicle (HEV), a plug-in hybrid vehicle (PHV), and an electric vehicle (EV) as a power source. As illustrated in FIGS. 1 and 2, the drive device 100 includes a motor 20, a transmission 60, a housing 10 having a motor housing 11 accommodating the motor 20 therein and a transmission housing 12 accommodating the transmission 60 therein, bearings 71 to 76, an inverter unit 80, and a pump 94. The motor housing 11 and the transmission housing 12 are separate bodies fixed to each other. The transmission housing 12 is fixed to one side in the axial direction of the motor housing 11. That is, the transmission housing 12 is connected to one side in the axial direction of the motor housing 11. Each of the bearings 71 to 76 is, for example, a ball bearing.

The motor 20 drives the drive device 100. The motor 20 includes a rotor 30 rotatable about a central axis J1 extending in the axial direction, and a stator 40. The rotor 30 includes a shaft 31 and a rotor body 32. The shaft 31 is rotatable about the central axis J1. The shaft 31 is rotatably supported by the bearings 71, 72, 73, and 74. Thus, the bearings 71, 72, 73, and 74 rotatably support the rotor 30.

In the present example embodiment, the shaft 31 is a hollow shaft. The shaft 31 has a columnar shape about the central axis J1 and extends axially. The shaft 31 is provided with a hole 33 connecting the inside of the shaft 31 and the outside of the shaft 31. The shaft 31 extends across the inside of the motor housing 11 and the inside of the transmission housing 12. An end on one side in the axial direction of the shaft 31 protrudes into the transmission housing 12. A speed-reduction device 61 is connected to an end on one side in the axial direction of the shaft 31.

In the present example embodiment, the shaft 31 is configured by connecting a first shaft member 31a and a second shaft member 31b in the axial direction. The first shaft member 31a is accommodated in the motor housing 11. The first shaft member 31a is provided with the hole 33. The second shaft member 31b is coupled to one side in the axial direction of the first shaft member 31a. The outer diameter of the second shaft member 31b is smaller than the outer diameter of the first shaft member 31a. The end on the other side in the axial direction of the second shaft member 31b is fitted into the inside of the end on one side in the axial direction of the first shaft member 31a. The second shaft member 31b extends from the inside of the motor housing 11 to the inside of the transmission housing 12. The first shaft member 31a and the second shaft member 31b are connected to each other by spline fitting, for example. The first shaft member 31a is rotatably supported by the bearings 71 and 72. The second shaft member 31b is rotatably supported by the bearings 73 and 74.

The rotor body 32 is fixed to the outer peripheral surface of the shaft 31. More specifically, the rotor body 32 is fixed to the outer peripheral surface of the first shaft member 31a. Although not illustrated in the drawings, the rotor body 32 includes a rotor core, and a rotor magnet fixed to the rotor core.

The stator 40 is located outward the rotor 30 in the radial direction. The stator 40 is fixed inside the motor housing 11. The stator 40 includes a stator core 41 and a coil assembly 42. The stator core 41 has an annular shape surrounding the rotor 30. The coil assembly 42 has a plurality of coils 42c attached to the stator core 41 along the circumferential direction. The plurality of coils 42c are attached to the stator core 41 with, for example, an insulator (not illustrated) interposed between them. Although not illustrated in the drawings, the coil assembly 42 may include a binding member or the like which is used to bind the coils 42c together, and may include a passage line arranged to join the coils 42c to one another. The coil assembly 42 includes a coil end 42a protruding from the stator core 41 to one side in the axial direction and a coil end 42b protruding from the stator core 41 to the other side in the axial direction.

The transmission 60 is connected to the motor 20. The transmission 60 transmits the rotation of the rotor 30 to the axle 64 of the vehicle. As illustrated in FIG. 1, the transmission 60 of the present example embodiment includes the speed-reduction device 61 connected to the motor 20 and a differential device 62 connected to the speed-reduction device 61.

The speed-reduction device 61 includes a first gear 61a, a second gear 61b, a third gear 61c, and a gear shaft 61d. The first gear 61a is fixed to a portion of the shaft 31 located inside the transmission housing 12. The second gear 61b and the third gear 61c are fixed to the gear shaft 61d. The second gear 61b meshes with the first gear 61a. The gear shaft 61d extends in the axial direction about a gear axis J2 extending in parallel with the central axis J1. The gear axis J2 is a virtual axis located on the lower side of the central axis J1. For example, the gear axis J2 is located on the rear side (−X side) of the central axis J1. The gear shaft 61d is rotatably supported by the bearings 75 and 76.

The differential device 62 includes a ring gear 62a. The ring gear 62a meshes with the third gear 61c. The lower end of the ring gear 62a is immersed in the oil O stored in the transmission housing 12. When the ring gear 62a rotates, the oil O is scraped up. The scraped oil O is supplied to, for example, the speed-reduction device 61 and the differential device 62 as lubricating oil. The differential device 62 rotates the axle 64 about a differential axis J3. The differential axis J3 is a virtual axis extending in parallel with the central axis J1.

The motor housing 11 accommodates the rotor 30 and the stator 40 in the inside. The motor housing 11 has a first housing 13 and a second housing 14. In the present example embodiment, the first housing 13 corresponds to a first housing, and the second housing 14 corresponds to a second housing.

The first housing 13 is a tubular member surrounding the motor 20 on the radial outside of the motor 20. In the present example embodiment, the inner peripheral surface of the first housing 13 has the cylindrical shape centered on the central axis J1. The first housing 13 is open to the other side in the axial direction. The first housing 13 is fixed to the transmission housing 12. The stator core 41 is fitted in the first housing 13. The first housing 13 includes a first facing wall 13a expanding in the radial direction, a peripheral wall 13b extending from a radially outer peripheral edge portion of the first facing wall 13a to the other side in the axial direction, and a bearing holding portion 13c provided on the first facing wall 13a.

The first facing wall 13a faces the transmission housing 12 in the axial direction. The first facing wall 13a is located on the other side in the axial direction of the transmission housing 12. The first facing wall 13a is fixed to the transmission housing 12. The first facing wall 13a has a hole 13d axially penetrating the first facing wall 13a. The hole 13d has a circular shape centered on the central axis J1. The second shaft member 31b passes through the hole 13d in the axial direction.

As illustrated in FIG. 2, the first facing wall 13a has a through hole 13e penetrating the first facing wall 13a in the axial direction. The through hole 13e is a through hole that connects a space S located between the first facing wall 13a and a second facing wall 15a to be described later in the axial direction and the inside of the motor housing 11. The through hole 13e is provided in a portion of the first facing wall 13a located on the lower side of the bearing holding portion 13c. The lower end of the through hole 13e is connected to the inner peripheral surface of the peripheral wall 13b.

Figure 3:
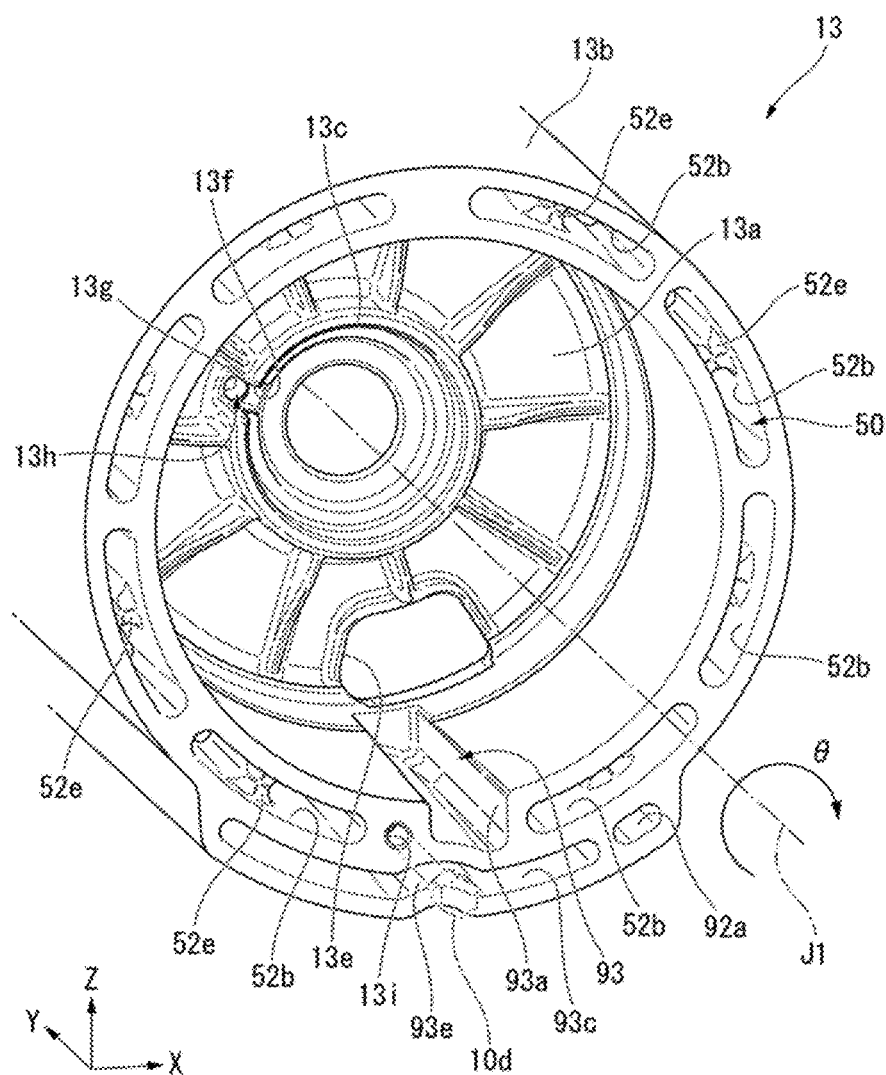
FIG. 3 is a perspective view illustrating a portion of a first housing of a motor housing of an example embodiment of the present invention.

In the present example embodiment, the bearing holding portion 13c is provided on the surface on the other side in the axial direction of the first facing wall 13a. The bearing holding portion 13c protrudes from the surface on the other side in the axial direction of the first facing wall 13a to the other side in the axial direction. As illustrated in FIG. 3, the bearing holding portion 13c has a cylindrical shape centered on the central axis J1. The bearing holding portion 13c has a penetration portion 13f penetrating the bearing holding portion 13c in the radial direction. In the present example embodiment, the penetration portion 13f penetrates a portion of the bearing holding portion 13c located above the central axis J1 and on the rear side (−X side) in the radial direction. The penetration portion 13f extends rearward and obliquely upward from the inner peripheral surface of the bearing holding portion 13c to the outer peripheral surface of the bearing holding portion 13c. As illustrated in FIG. 1, the bearing holding portion 13c holds the bearing 72 therein.

Figure 4:
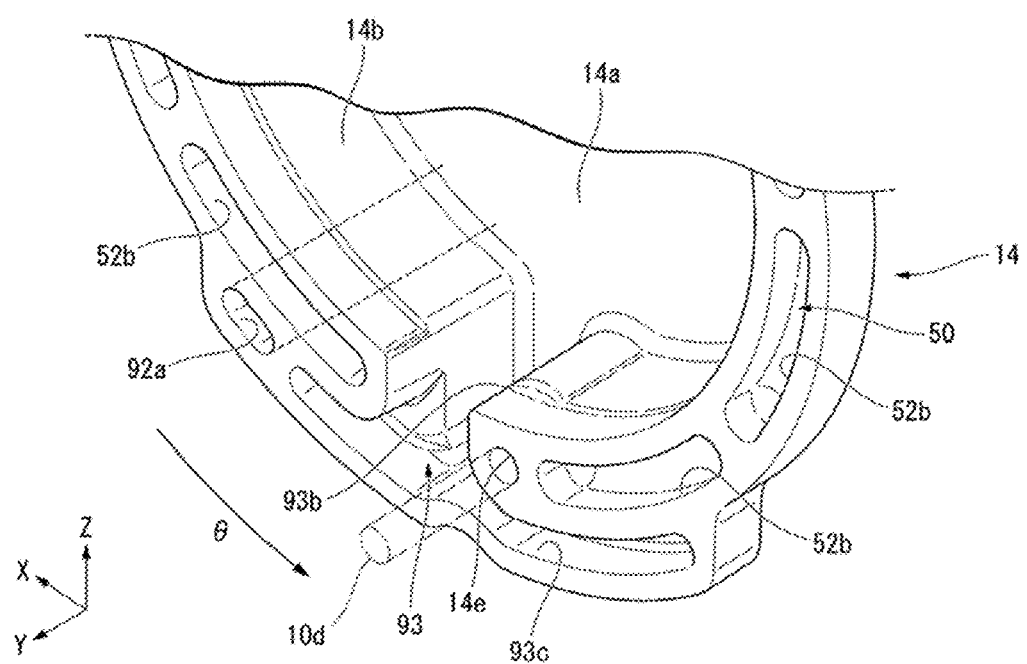
FIG. 4 is a perspective view illustrating a portion of a second housing of the motor housing of an example embodiment of the present invention.

The second housing 14 is separate from the first housing 13. The second housing 14 is fixed to the other side in the axial direction of the first housing 13. The second housing 14 closes the opening on the other side in the axial direction of the first housing 13. As illustrated in FIG. 4, the second housing 14 includes a lid wall 14a that expands in the radial direction, and a peripheral wall 14b that extends from a radially outer peripheral edge portion of the lid wall 14a to one side in the axial direction. As illustrated in FIG. 1, an end on one side in the axial direction of the peripheral wall 14b is in contact with an end on the other side in the axial direction of the peripheral wall 13b in the first housing 13. The lid wall 14a has a recess 14c recessed from the surface on one side in the axial direction of the lid wall 14a to the other side in the axial direction. A portion on one side in the axial direction of the recess 14c is a bearing holding portion 14d that holds the bearing 71 therein.

In the present example embodiment, the inverter unit 80 is attached to the motor housing 11. The inverter unit 80 is fixed to a rear surface of the motor housing 11. Although not illustrated, the inverter unit 80 has an inverter circuit electrically connected to the stator 40.

The transmission housing 12 accommodates the speed-reduction device 61 and the differential device 62 therein. As illustrated in FIG. 2, the transmission housing 12 protrudes on the lower side from the motor housing 11. The bottom located on the lower side of the inner surface of the transmission housing 12 is located on the lower side of the bottom located on the lower side of the inner surface of the motor housing 11. The transmission housing 12 includes a third housing 15 fixed to the first housing 13 and a fourth housing 16 fixed to one side in the axial direction of the third housing 15.

The third housing 15 includes a second facing wall 15a expanding in the radial direction, a peripheral wall 15b extending from a radially outer peripheral edge portion of the second facing wall 15a to one side in the axial direction, and bearing holding portions 15c and 15d provided on the second facing wall 15a. The second facing wall 15a faces the first facing wall 13a in the axial direction. The second facing wall 15a is fixed to one side in the axial direction of the first facing wall 13a. The second facing wall 15a has a hole 15f axially penetrating the second facing wall 15a. The hole 15f has a circular shape centered on the central axis J1. The second shaft member 31b passes through the hole 15f in the axial direction.

The second facing wall 15a has a recess 15e recessed from the surface on the other side in the axial direction of the second facing wall 15a toward the one side in the axial direction. The inner peripheral edge of the recess 15e has, for example, a circular shape centered on the central axis J1 when viewed in the axial direction. The opening on the other side in the axial direction of the recess 15e is closed by the first facing wall 13a. The space S is provided between the first facing wall 13a and the second facing wall 15a in the axial direction. The space S is configured by the inside of the recess 15e.

As illustrated in FIG. 2, the second facing wall 15a has a through hole 15h penetrating the second facing wall 15a in the axial direction. The through hole 15h is a through hole connecting the space S located between the first facing wall 13a and the second facing wall 15a in the axial direction and the inside of the transmission housing 12. The through hole 15h is provided in a portion of the second facing wall 15a located on the lower side of the bearing holding portion 15c. The through hole 15h is provided at the lower end of the bottom of the recess 15e. The bottom of the recess 15e is a surface located on one side in the axial direction and facing the other side in the axial direction of the inner surface of the recess 15e. The lower end of the through hole 15h is connected to the inner peripheral surface of the recess 15e. For example, the through hole 15h is disposed to face one side in the axial direction of the through hole 13e provided in the first facing wall 13a with a gap.

In the present example embodiment, the first facing wall 13a and the second facing wall 15a constitute a partition wall 19 that separates the inside of the motor housing 11 and the inside of the transmission housing 12. That is, the housing 10 has the partition wall 19. The partition wall 19 has a through hole 19a connecting the inside of the motor housing 11 and the inside of the transmission housing 12. The through hole 19a penetrates the partition wall 19 in the axial direction. In the present example embodiment, the through hole 19a is configured by the through hole 13e provided in the first facing wall 13a, a lower end of the recess 15e, and the through hole 15h provided in the second facing wall 15a.

Figure 5:
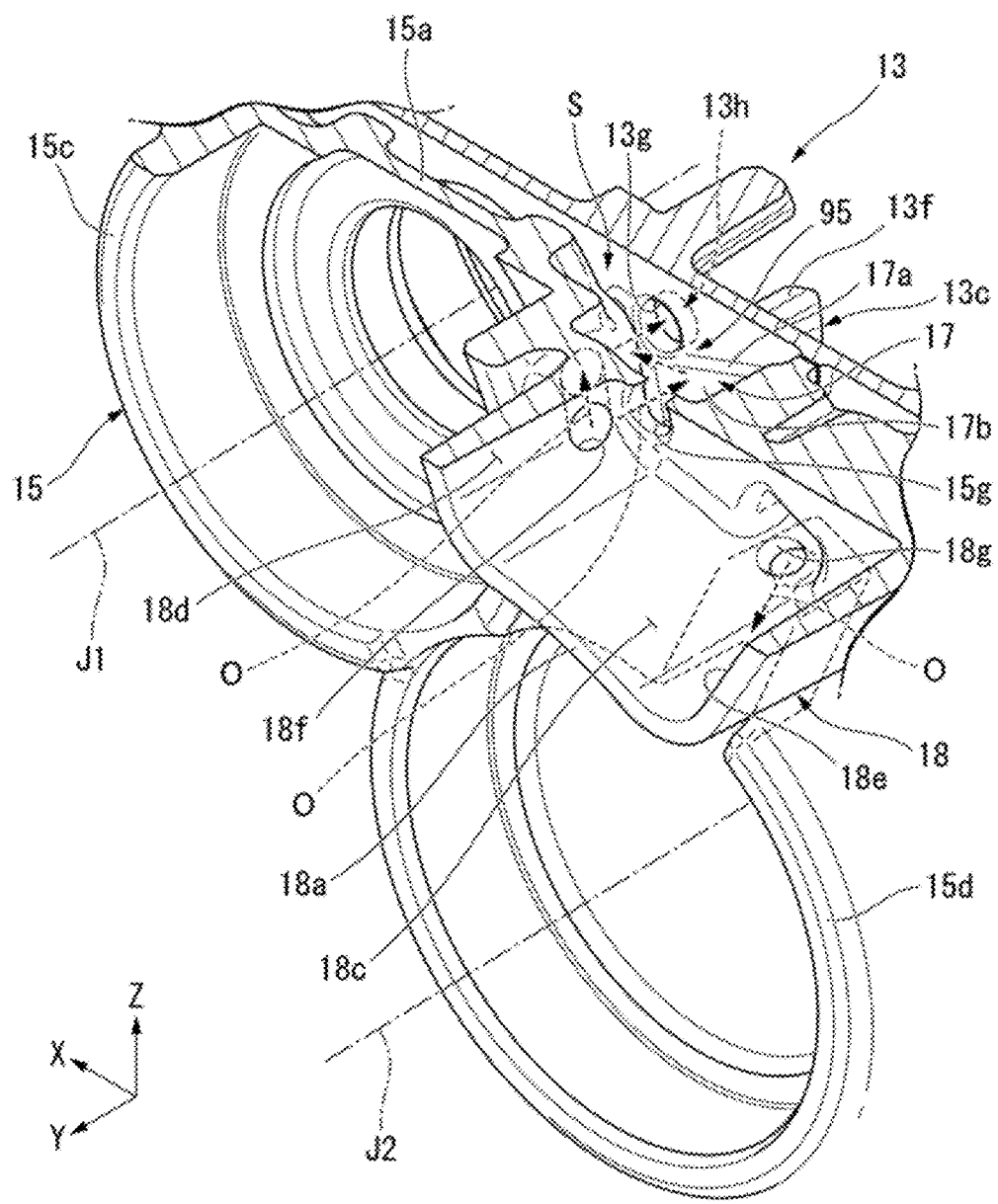
FIG. 5 is a sectional perspective view illustrating a portion of an oil supply path of an example embodiment of the present invention.

In the present example embodiment, the bearing holding portions 15*c* and 15*d* are provided on the surface on one side in the axial direction of the second facing wall 15*a*. The bearing holding portions 15*c* and 15*d* protrude to the one side in the axial direction from the surface on the one side in the axial direction of the second facing wall 15*a*. As illustrated in FIG. 5, the bearing holding portion 15*c* has a cylindrical shape centered on the central axis J1. The bearing holding portion 15*d* has a cylindrical shape centered on the gear axis J2. As illustrated in FIG. 1, the bearing holding portion 15*c* holds the bearing 73 therein. The bearing holding portion 15*d* holds the bearing 75 therein.

The fourth housing 16 includes a lid wall 16*a* expanding in the radial direction, a peripheral wall 16*b* extending from the radially outer peripheral edge portion of the lid wall 16*a* to the other side in the axial direction, and bearing holding portions 16*c* and 16*d* provided on the lid wall 16*a*. The end on the other side in the axial direction of the peripheral wall 16*b* is in contact with the end on one side in the axial direction of the peripheral wall 15*b* of the third housing 15 in the axial direction.

In the present example embodiment, the bearing holding portions 16*c* and 16*d* are provided on the surface on the other side in the axial direction of the lid wall 16*a*. The bearing holding portions 16*c* and 16*d* protrude from the surface on the other side in the axial direction of the lid wall 16*a* to the other side in the axial direction. Although not illustrated, the bearing holding portion 16*c* has a cylindrical shape centered on the central axis J1. The bearing holding portion 16*d* has a cylindrical shape centered on the gear axis J2. The bearing holding portion 16*c* holds the bearing 74 therein. The bearing holding portion 16*d* holds the bearing 76 therein.

For example, the oil O is accommodated in the transmission housing 12. The oil O is stored in a lower region in the transmission housing 12. The oil O is used as a refrigerant for cooling the motor 20. The oil O is also used as lubricating oil for the speed-reduction device 61 and the differential device 62. An oil equivalent to a lubricating oil (ATF: Automatic Transmission Fluid) for an automatic transmission having a relatively low viscosity is preferably used as the oil O so that the oil O can perform functions of a lubricating oil and a cooling oil. In the present example embodiment, the oil O corresponds to the first fluid.

In the present example embodiment, the pump 94 is attached to the transmission housing 12. The pump 94 is attached to a lower surface of the transmission housing 12. The pump 94 is a pump that causes the oil O to flow into a second supply flow path 92 described later. In the present example embodiment, the pump 94 is an electric pump. The pump 94 may be a mechanical pump rotated by the shaft 31 or the gear shaft 61*d*.

Although not illustrated, a space between the first housing 13 and the second housing 14 in the axial direction, a space between the first housing 13 and the third housing 15 in the axial direction, and a space between the third housing 15 and the fourth housing 16 in the axial direction are sealed by seal members. The seal member is, for example, a liquid gasket.

Figure 6:
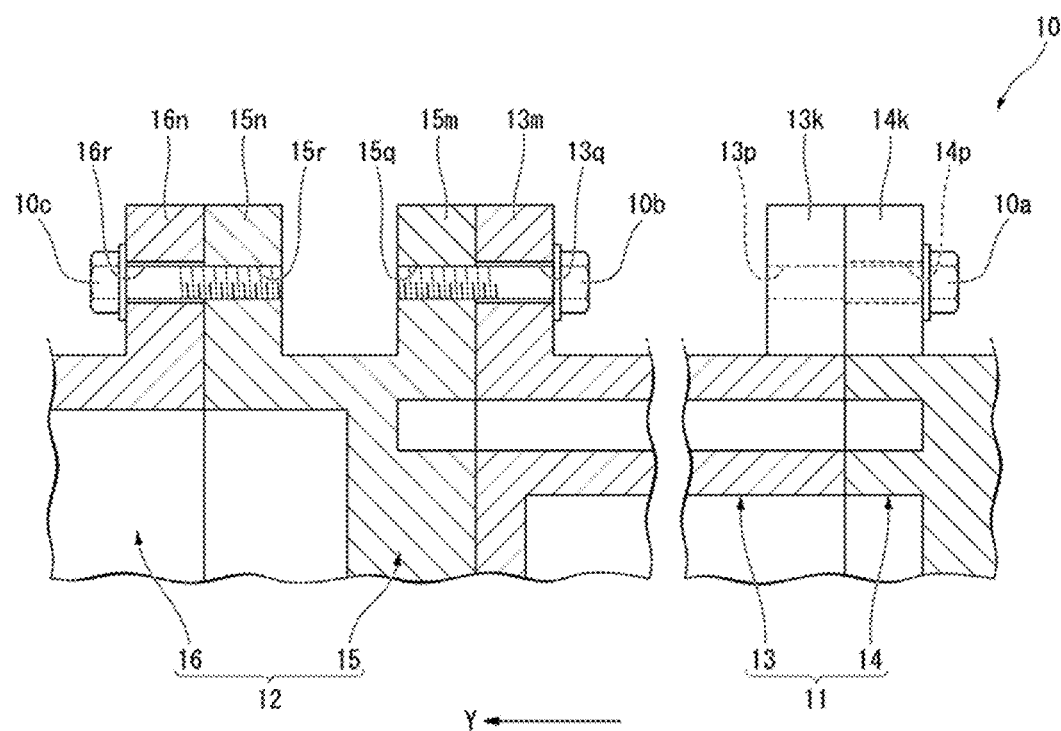
FIG. 6 is a sectional view illustrating a portion of the housing of an example embodiment of the present invention.

In the present example embodiment, the first housing 13, the second housing 14, the third housing 15, and the fourth housing 16 are fixed with bolts. More specifically, as illustrated in FIG. 6, the first housing 13 and the second housing 14 are fixed to each other by bolts 10*a*. The first housing 13 and the third housing 15 are fixed to each other by bolts 10*b*. The third housing 15 and the fourth housing 16 are fixed to each other by bolts 10*c*. A plurality of bolts 10*a*, a plurality of bolts 10*b*, and a plurality of bolts 10*c* are provided to surround the central axis J1.

Figure 7:
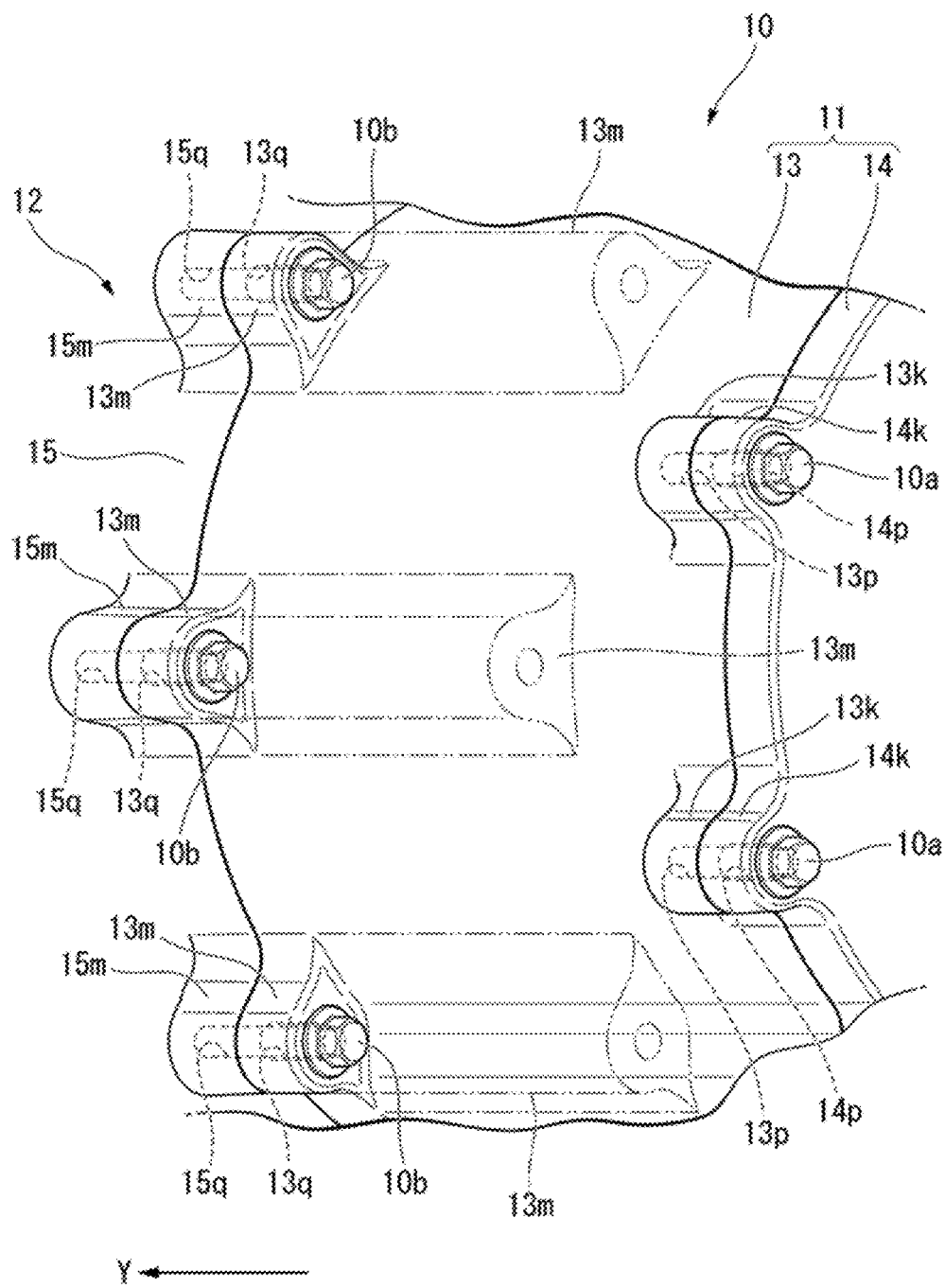
FIG. 7 is a perspective view illustrating a portion of the housing of an example embodiment of the present invention.

The plurality of bolts 10*a* fix a plurality of protrusions 13*k* provided on the outer peripheral surface of the first housing and a plurality of protrusions 14*k* provided on the outer peripheral surface of the second housing 14, respectively. The protrusion 13*k* is provided at an end on the other side in the axial direction of the outer peripheral surface of the first housing 13. The protrusion 13*k* protrudes radially outward. As illustrated in FIG. 7, the plurality of protrusions 13*k* is disposed at intervals along the circumferential direction. The protrusion 13*k* has a female screw hole 13*p* recessed from the surface on the other side in the axial direction of the protrusion 13*k* toward the one side in the axial direction. In the present example embodiment, the female screw hole 13*p* penetrates the protrusion 13*k* in the axial direction. The female screw hole 13*p* may be a hole having a bottom on one side in the axial direction.

The protrusion 14*k* is provided at an end on one side in the axial direction of the outer peripheral surface of the second housing 14. The protrusion 14*k* protrudes radially outward. The plurality of protrusions 14*k* is disposed at intervals along the circumferential direction. The surface on one side in the axial direction of the protrusion 14*k* is in contact with the surface on the other side in the axial direction of the protrusion 13*k*. The protrusion 14*k* has a fixing hole 14*p* axially penetrating the protrusion 14*k*. When viewed in the axial direction, the fixing hole 14*p* and the female screw hole 13*p* overlap each other. The bolt 10*a* passes through the fixing hole 14*p* from the other side in the axial direction and is tightened into the female screw hole 13*p*. Thus, the first housing 13 and the second housing 14 are fixed with the bolt 10*a*.

The plurality of bolts 10*b* fix a plurality of protrusions 13*m* provided on the outer peripheral surface of the first housing and a plurality of protrusions 15*m* provided on the outer peripheral surface of the third housing 15, respectively. The protrusion 13*m* is provided at an end on one side in the axial direction of the outer peripheral surface of the first housing 13. The protrusion 13*m* protrudes radially outward. The plurality of protrusions 13*m* are disposed at intervals along the circumferential direction. The circumferential position of the protrusion 13*m* is shifted from the circumferential position of the protrusion 13*k*. The circumferential position of the protrusion 13*m* is, for example, a circumferential central position between the protrusions 13*k* adjacent in the circumferential direction. The protrusion 13*m* has a fixing hole 13*q* axially penetrating the protrusion 13*m*.

The protrusion 15*m* is provided at the end on the other side in the axial direction of the outer peripheral surface of the third housing 15. The protrusion 15*m* protrudes radially outward. The plurality of protrusions 15*m* are disposed at intervals along the circumferential direction. The surface on the other side in the axial direction of the protrusion 15*m* is in contact with the surface on one side in the axial direction of the protrusion 13*m*. The protrusion 15*m* has a female screw hole 15*q* recessed from the surface on the other side in the axial direction of the protrusion 15*m* to the one side in the axial direction. In the present example embodiment, the female screw hole 15*q* penetrates the protrusion 15*m* in the axial direction. The female screw hole 15*q* may be a hole having a bottom on one side in the axial direction.

When viewed in the axial direction, the fixing hole 13*q* and the female screw hole 15*q* overlap each other. The bolt 10*b* passes through the fixing hole 13*q* from the other side in the axial direction and is tightened into the female screw hole 15*q*. Thus, the first housing 13 and the third housing 15 are fixed with the bolt 10*b*.

As described above, in the present example embodiment, the first housing 13 and the third housing 15 are fixed to each other by the bolt 10*b* tightened from the same side as the bolt 10*a* for fixing the first housing 13 and the second housing 14. That is, the bolt 10*b* for fixing the first housing 13 and the third housing 15 is inserted into the fixing hole 13*q* and the female screw hole 15*q* in the same direction as the bolt 10*a* for fixing the first housing 13 and the second housing 14.

As illustrated in FIG. 6, the bolt 10*c* fixes a protrusion 15*n* provided at the end on one side in the axial direction of the outer peripheral surface of the third housing 15 and a protrusion 16*n* provided at the end on the other side in the axial direction of the outer peripheral surface of the fourth housing 16. Although not illustrated, a plurality of protrusions 15*n* and a plurality of protrusions 16*n* are provided at intervals in the circumferential direction. The protrusion 15*n* and the protrusion 16*n* protrude radially outward. The circumferential positions of the protrusion 15*n* and the protrusion 16*n* may be the same as the circumferential positions of the protrusion 13*m* and the protrusion 15*m*, or may be positions shifted in the circumferential direction.

The protrusion 15*n* has a female screw hole 15*r* recessed from the surface on one side in the axial direction of the protrusion 15*n* to the other side in the axial direction. In the present example embodiment, the female screw hole 15*r* penetrates the protrusion 15*n* in the axial direction. The female screw hole 15*r* may be a hole having a bottom on the other side in the axial direction. The protrusion 16*n* has a fixing hole 16*r* axially penetrating the protrusion 16*n*. The bolt 10*c* passes through the fixing hole 16*r* from one side in the axial direction and is tightened into the female screw hole 15*r*. Thus, the third housing 15 and the fourth housing 16 are fixed with the bolt 10*c*.

As described above, in the present example embodiment, the third housing 15 and the fourth housing 16 are fixed to each other by the bolt 10*a* for fixing the first housing 13 and the second housing 14 and the bolt 10*c* tightened from the side opposite to the side where the bolt 10*b* for fixing the first housing 13 and the third housing 15 is tightened. That is, the bolt 10*c* for fixing the third housing 15 and the fourth housing 16 is inserted into the fixing hole 16*r* and the female screw hole 15*r* in a direction different from the bolt 10*a* for fixing the first housing 13 and the second housing 14 and the bolt 10*b* for fixing the first housing 13 and the third housing 15.

As described above, in the present example embodiment, the first housing 13 and the third housing 15 are fixed by the bolt 10*b* from the same side as the side on which the first housing 13 and the second housing 14 are fixed by the bolt 10*a* in the axial direction. Therefore, the work of fixing the first housing 13 and the second housing 14 and the work of fixing the first housing 13 and the third housing 15 can be performed from the same side in the axial direction, that is, from the other side in the axial direction in the present example embodiment. Accordingly, assembling workability of the housing 10 can be improved.

Here, in the present example embodiment, the transmission housing 12 has a shape protruding radially outward from the motor housing 11. In such a case, when an attempt is made to fix the first housing 13 and the third housing 15 by inserting the bolt from the side where the transmission housing 12 is located with respect to the motor housing 11, that is, from one side in the axial direction, it is necessary to arrange the fixing portion of the bolt on the radially outer side in order to avoid interference with the transmission housing 12 itself. Therefore, the housing 10 tends to be enlarged.

On the other hand, for example, when the first housing 13, the third housing 15, and the fourth housing 16 are fastened together by bolts inserted from one side in the axial direction, the first housing 13 and the third housing 15 can be fixed while suppressing an increase in size of the housing 10. However, in this case, when the bolt is removed to separate the motor housing 11 and the transmission housing 12, the third housing 15 and the fourth housing 16 constituting the transmission housing 12 are also separated. Therefore, in the state of not being fixed to the motor housing 11, the transmission housing 12 cannot be handled in a combined state. As a result, the easy of assembly of the housing tends to deteriorate. In addition, workability tends to deteriorate when performing maintenance of the drive device 100, replacing the transmission 60, and the like.

In addition, the axial force by the bolt necessary for suitably maintaining the sealing property may be different between the seal member provided between the first housing 13 and the third housing 15 in the axial direction and the seal member provided between the third housing 15 and the fourth housing 16 in the axial direction. Therefore, when the first housing 13, the third housing 15, and the fourth housing 16 are fastened together with the same bolt, it may be difficult to suitably apply an axial force to the seal members disposed between the respective housings. Therefore, problems such as a decrease in sealability between the housings and difficulty in adjusting the axial force of the bolt are likely to occur.

The problem in the case of fastening the first housing 13, the third housing 15, and the fourth housing 16 together by the bolt inserted from one side in the axial direction is the same as the problem in the case of fastening the first housing 13, the second housing 14, and the third housing 15 together by the bolt inserted from the other side in the axial direction.

In view of the above problem, according to the present example embodiment, as described above, the first housing 13 and the third housing 15 are fixed by the bolt 10*b* from the same side as the side on which the first housing 13 and the second housing 14 are fixed by the bolt 10*a* in the axial direction. Therefore, it is possible to suppress the interference of the bolt 10*b* with the transmission housing 12 even if the position of the portion fixed by the bolt 10*b* is not changed to the more radially outer position. As a result, the first housing 13 and the third housing 15 can be fixed with the bolt 10*b* while suppressing an increase in size of the housing 10. Further, even if the bolt 10*b* is removed, only the first housing 13 and the third housing 15 are separated, and the third housing 15 and the fourth housing 16 are not separated. Therefore, even in a state where the transmission housing is not fixed to the motor housing 11, the transmission housing 12 can be handled in a combined state. As a result, it is possible to suppress deterioration in the ease of assembly of the housing 10. In addition, it is possible to suppress deterioration of workability when performing maintenance of the drive device 100, replacing the transmission 60, and the like. Further, since the axial forces of the bolt 10*b* and the bolt 10*c* can be changed, different axial forces can be individually applied to the seal member located between the first housing 13 and the third housing 15 and the seal member located between the third housing 15 and the fourth housing 16. As a result, sealability between the housings can be easily secured, and the axial forces of the bolts 10b and 10c can be easily adjusted. The same applies to the seal member between the first housing 13 and the second housing 14.

In addition, for example, if another housing is disposed between the motor housing 11 and the transmission housing 12 and the motor housing 11 and the transmission housing 12 are fixed to the another housing, the motor housing 11 and the transmission housing 12 can be separated in an assembled state. However, in this case, the number of components constituting the housing 10 increases by the provision of the other housing. On the other hand, according to the present example embodiment, as described above, it is possible to separate the motor housing 11 and the transmission housing 12 in an assembled state without providing the other members. Therefore, it is possible to suppress an increase in the number of components constituting the housing 10. In addition, since it is not necessary to provide the other member, the weight of the drive device 100 can be reduced. As a result, even when the structure of the drive device 100 is a water-cooled structure in which the motor 20 is cooled by water W as in the present example embodiment, it is possible to suppress an increase in the weight of the entire drive device 100.

As indicated by a two-dot chain line in FIG. 7, the protrusion 13m provided in the first housing 13 may extend in the axial direction. In this case, the end on the other side in the axial direction of the protrusion 13m can be brought close to the protrusion 13k. As a result, when the work of fixing the first housing 13 and the third housing 15 is performed from the other side in the axial direction, the position where the jig and the tool for fastening the bolt 10b are used can be brought close to the position where the jig and the tool are used when the work of fixing the first housing 13 and the second housing 14 is performed. In addition, axial dimensions of the jig and the tool can be shortened. Thus, the workability of the work of fixing the first housing 13 and the third housing 15 with the bolt 10b can be improved. In particular, the bolt 10b can be suitably tightened to suitably generate the axial force.

The end on the other side in the axial direction of the protrusion 13m indicated by a two-dot chain line in FIG. 7 is located, for example, on the other side in the axial direction with respect to the center in the axial direction of the first housing 13. The end on the other side in the axial direction of the protrusion 13m indicated by a two-dot chain line in FIG. 7 is located, for example, on the one side in the axial direction with respect to the end on the one side in the axial direction of the protrusion 13k. Thus, the protrusion 13m can be prevented from interfering with the protrusion 13k.

As illustrated in FIGS. 3 and 4, in the present example embodiment, the first housing 13 and the second housing 14 are also fixed by bolts 10d different from the plurality of bolts 10a described above. As illustrated in FIG. 3, the first housing 13 has a female screw hole 13i recessed from the end surface on the other side in the axial direction of the peripheral wall 13b toward the one side in the axial direction. The female screw hole 13i is located between a groove portion 93a to be described later and a second circumferential flow path portion 52b of a second flow path 50 to be described later in the circumferential direction. The female screw hole 13i is located radially inside a collection flow path body 93c described later.

As illustrated in FIG. 4, the second housing 14 has a fixing hole 14e penetrating the second housing 14 in the axial direction. The fixing hole 14e is located between a connection portion 93b to be described later and a second circumferential flow path portion 52b of the second flow path 50 to be described later in the circumferential direction. The fixing hole 14e is located radially inside the collection flow path body 93c described later. The bolt 10d passed through the fixing hole 14e from the other side in the axial direction is tightened into the female screw hole 13i. Thus, in the present example embodiment, the first housing 13 and the second housing 14 are fixed to each other at positions radially inside a collection flow path 93 to be described later and adjacent to the second flow path 50 in the circumferential direction.

Figure 8:
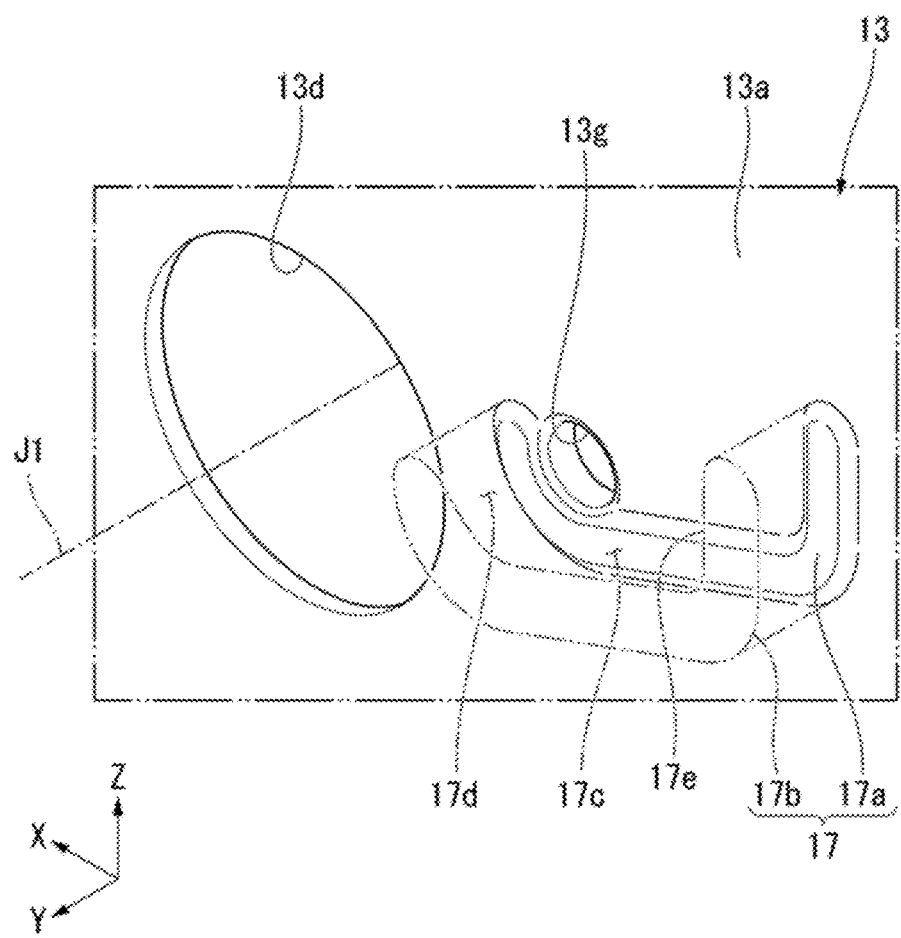
FIG. 8 is a perspective view illustrating a first gutter portion of an example embodiment of the present invention.

The housing 10 has a first gutter portion 17. The first gutter portion 17 is located between the first facing wall 13a and the second facing wall 15a in the axial direction. That is, the first gutter portion 17 is located in the space S. As illustrated in FIG. 8, the first gutter portion 17 has a gutter shape that opens upward and extends in the axial direction. The oil O flows into the first gutter portion 17. The first gutter portion 17 is a reservoir capable of storing the oil O therein. In the present example embodiment, the first gutter portion 17 is located on the rear side (−X side) of the central axis J1. The first gutter portion 17 is located behind the hole 13d.

The first gutter portion 17 connects the first facing wall 13a and the second facing wall 15a. In the present example embodiment, the first gutter portion 17 has a first portion 17a protruding to one side in the axial direction from a surface on one side (+Y side) in the axial direction of the first facing wall 13a, and a second portion 17b protruding to the other side in the axial direction from a surface on the other side (−Y side) in the axial direction of the second facing wall 15a. The end on one side in the axial direction of the first portion 17a and the end on the other side in the axial direction of the second portion 17b are connected to each other. The axial dimension of the second portion 17b is larger than the axial dimension of the first portion 17a.

The first gutter portion 17 has a bottom 17c facing upward, and a pair of side surfaces 17d and 17e protruding upward from both sides of the bottom 17c in the front-rear direction. The bottom 17c and the pair of side surfaces 17d and 17e extend in the axial direction. The bottom 17c and the pair of side surfaces 17d and 17e connect the first facing wall 13a and the second facing wall 15a. The pair of side surfaces 17d and 17e is disposed to face each other at an interval in the axial direction. The side surface 17d is located on the front side (+X side) of the side surface 17e.

The bottom 17c is inclined in the vertical direction with respect to the front-rear direction. The bottom 17c is located on the lower side toward the front side (+X side). In the present example embodiment, the bottom 17c is an inclined surface located on the lower side as approaching a first hole 13g provided in the first facing wall 13a. Therefore, it is easy to guide the oil O in the first gutter portion 17 into the first hole 13g along the bottom 17c using gravity. The first hole 13g penetrates the first facing wall 13a in the axial direction. The first hole 13g is, for example, a circular hole. The first hole 13g opens at the front end of the inside of the first gutter portion 17. The first hole 13g is connected to the bottom 17c and the side surface 17d.

As illustrated in FIG. 5, the first gutter portion 17 is connected to a portion located on the lower side of the first hole 13g in the surface on one side in the axial direction of the first facing wall 13a and a portion located on the lower side of the second hole 15g in the surface on the other side in the axial direction of the second facing wall 15a. The second hole 15g penetrates the second facing wall 15a in the axial direction. The second hole 15g is, for example, a circular hole. The second hole 15g opens at the end on a rear side (−X side) of the inside of the first gutter portion 17 and the end on a front side (+X side) of the inside of a second gutter portion 18.

Figure 9:
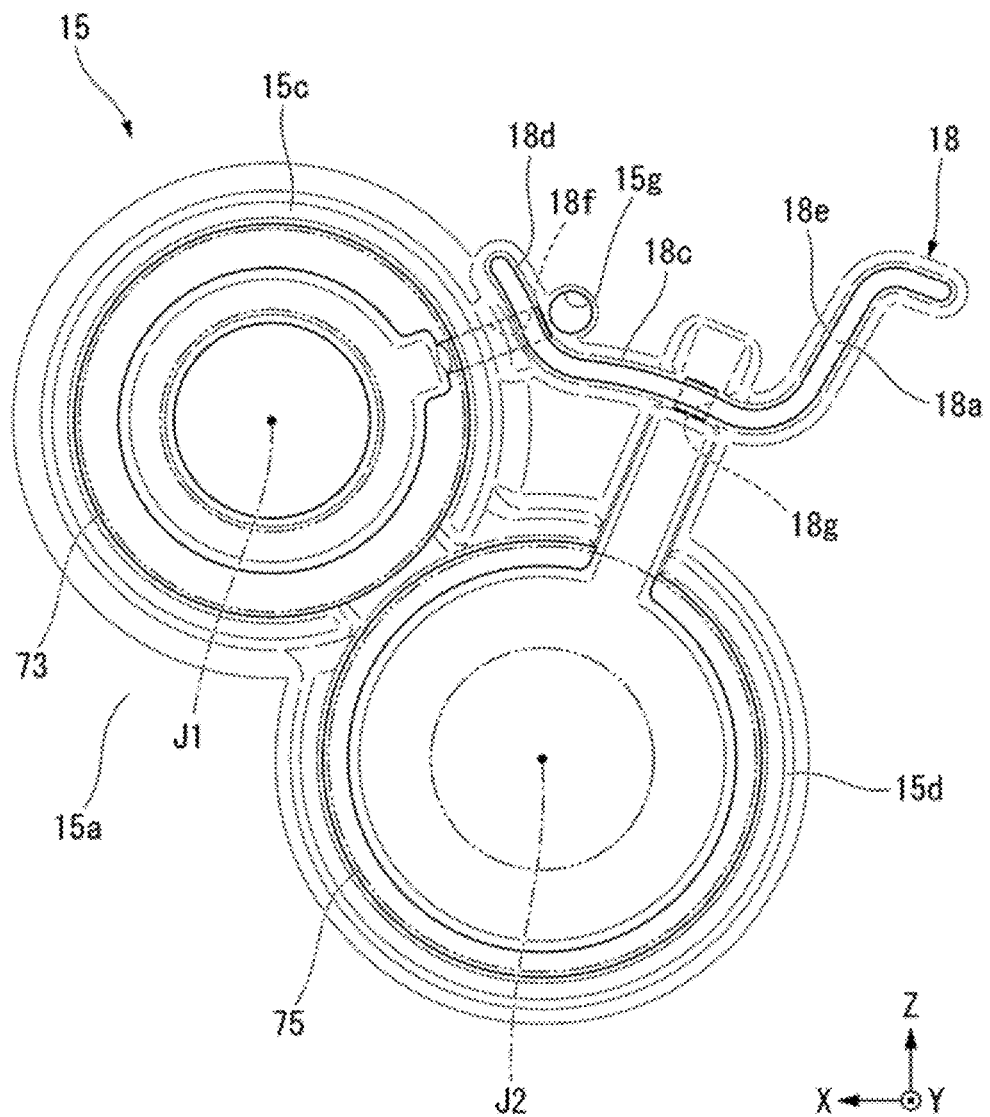
FIG. 9 is a view of a second gutter portion of an example embodiment of the present invention as viewed from one side in the axial direction.

As illustrated in FIG. 2, the housing 10 has the second gutter portion 18. The second gutter portion 18 is located inside the transmission housing 12. As illustrated in FIGS. 5 and 9, the second gutter portion 18 has a gutter shape that opens upward and extends in the axial direction. The oil O flows into the second gutter portion 18. The second gutter portion 18 is a reservoir capable of storing the oil O therein. In the present example embodiment, the second gutter portion 18 is located on the rear side (−X side) of the central axis J1. The second gutter portion is located above the bearing holding portion 15d. As illustrated in FIG. 5, the end on the front (+X side) side of the second gutter portion 18 is located on one side (+Y side) in the axial direction of the rear end of the first gutter portion 17.

As illustrated in FIG. 2, the second gutter portion 18 connects the first facing wall 13a and the second facing wall 15a. In the present example embodiment, the second gutter portion 18 has a first portion 18a protruding to one side in the axial direction from a surface on one side (+Y side) in the axial direction of the second facing wall 15a, and a second portion 18b protruding to the other side in the axial direction from a surface on the other side (−Y side) in the axial direction of the lid wall 16a. The end on one side in the axial direction of the first portion 18a and the end on the other side in the axial direction of the second portion 18b are connected to each other.

As illustrated in FIG. 9, the second gutter portion 18 has a bottom 18c facing upward, and a pair of side surfaces 18d and 18e protruding upward from both sides of the bottom 18c in the front-rear direction. The bottom 18c and the pair of side surfaces 18d and 18e extend in the axial direction. The bottom 18c and the pair of side surfaces 18d and 18e connect the second facing wall 15a and the lid wall 16a. The pair of side surfaces 18d and 18e are disposed to face each other at an interval in the axial direction.

The side surface 18d is located on the front side (+X side) of the side surface 18e. The side surface 18d is inclined in the front-rear direction with respect to the vertical direction. The side surface 18d is located on the front side (+X side) as it goes upward. In the present example embodiment, the side surface 18d is an inclined surface located on the lower side as approaching the second hole 15g. Therefore, the oil O that has entered the second gutter portion 18 is easily guided to the inside of the second hole 15g along the side surface 18d using gravity.

The side surface 18e is inclined in the front-rear direction with respect to the vertical direction. The side surface 18d is located on the rear side (−X side) as it goes upward. The bottom 18c is inclined in the vertical direction with respect to the front-rear direction. The bottom 18c is located on the lower side toward the rear side (−X side).

As illustrated in FIG. 5, the second gutter portion 18 is connected to a portion located on the lower side of the second hole 15g in the surface on one side in the axial direction of the second facing wall 15a. The second gutter portion 18 is provided with supply holes 18f and 18g. The supply hole 18f connects the inside of the second gutter portion 18 and the inside of the bearing holding portion 15c. Therefore, a part of the oil O entering the second gutter portion 18 is supplied to a bearing 73 in the bearing holding portion 15c via the supply hole 18f. As illustrated in FIG. 9, the supply hole 18f opens to the side surface 18d. The supply hole 18f extends forward (+X side) and obliquely on the lower side from the side surface 18d.

The supply hole 18g connects the inside of the second gutter portion 18 and the inside of the bearing holding portion 15d. Therefore, a part of the oil O entering the second gutter portion 18 is supplied to the bearing 75 in the bearing holding portion 15d via the supply hole 18g. The supply hole 18g is open to the bottom 18c. The supply hole 18g extends on the lower side and obliquely forward (+X side) from the bottom 18c.

As illustrated in FIG. 2, the housing 10 includes a first flow path 90 and a second flow path 50. The first flow path 90 is a flow path through which the oil O as the first fluid flows. The second flow path 50 is a flow path through which the water W as the second fluid flows.

In the present specification, the "flow path" means a path through which a fluid flows. Therefore, the concept of "flow path" includes not only a "flow path", in which a steady flow of a fluid in one direction is generated, but also a channel in which the fluid is allowed to temporarily stay, and a channel along which the fluid drips. Examples of the channel in which the fluid is allowed to temporarily stay include a reservoir or the like arranged to store the fluid.

The first flow path 90 includes a first supply flow path 91, a second supply flow path 92, and a collection flow path 93. The first supply flow path 91 and the second supply flow path 92 are supply flow paths for supplying the oil O in the transmission housing 12 to the inside of the motor housing 11.

The first supply flow path 91 includes a scraping-up channel 91a, a shaft supply channel 91b, an intra-shaft channel 91c, and an intra-rotor channel 90a. The scraping-up channel 91a is a path in which the oil O in the transmission housing 12 is scraped up by the rotation of the ring gear 62a of the differential device 62 and enters the second gutter portion 18. The shaft supply channel 91b is a path through which the oil O in the second gutter portion 18 flows into the bearing holding portion 16c through a flow path (not illustrated) provided in the lid wall 16a and flows into the shaft 31 from the bearing holding portion 16c. When the oil O flows into the bearing holding portion 16c in the shaft supply channel 91b, the oil O is supplied to the bearing 74 held by the bearing holding portion 16c. In the shaft supply channel 91b of the present example embodiment, the oil O flows in from the end on one side in the axial direction of the shaft 31.

The intra-shaft channel 91c is a path through which the oil O flowing into the shaft 31 from the end on one side in the axial direction of the shaft 31 flows to the other side in the axial direction in the shaft 31. The intra-rotor channel 90a is a path for the oil O in the shaft 31 to pass through the inside of the rotor body 32 from the hole 33 and to be scattered to the stator 40. In this manner, the oil O is supplied to the rotor 30 and the stator 40 by the first supply flow path 91.

As illustrated in FIG. 1, the second supply flow path 92 includes an introduction flow path portion 92a, a connecting flow path portion 92b, an intra-shaft channel 92c, and the intra-rotor channel 90a. The introduction flow path portion 92a extends in the axial direction from the inside of the transmission housing 12. More specifically, the introduction flow path portion 92a extends from the inside of the transmission housing 12 to the other side in the axial direction, passes through the second facing wall 15a, the first facing wall 13a, and the peripheral wall 13b, and extends to the second housing 14. The oil O sucked from the inside of the transmission housing 12 by the pump 94 flows into the introduction flow path portion 92a. In the introduction flow path portion 92a, the oil O flows to the other side in the axial direction.

As illustrated in FIG. 3, a cross section of the flow path of the introduction flow path portion 92a has an oval shape elongated in the circumferential direction. The circumferential dimension of the introduction flow path portion 92a is smaller than the circumferential dimension of the collection flow path body 93c to be described later, the circumferential dimension of a first circumferential flow path portion 52a to be described later, and the circumferential dimension of a second circumferential flow path portion 52b to be described later. Therefore, the circumferential dimension of the introduction flow path portion 92a can be made relatively small. As a result, the pressure loss generated in the oil O flowing in the introduction flow path portion 92a can be reduced. Therefore, the oil O can be easily fed into the introduction flow path portion 92a by the pump 94.

For example, the introduction flow path portion 92a is located on the front side (+X side) and the lower side with respect to the central axis J1. At least a part of the introduction flow path portion 92a is located radially outside the second flow path 50. In the present example embodiment, almost the entire introduction flow path portion 92a except for both axial ends is located radially outside the second flow path 50. The introduction flow path portion 92a is located below the second flow path 50.

As illustrated in FIG. 1, the connecting flow path portion 92b is provided in the lid wall 14a of the second housing 14. The connecting flow path portion 92b extends upward from an end on the other side in the axial direction of the introduction flow path portion 92a, and is connected to recess 14c. As a result, the oil O flows into the recess 14c. Part of the oil O flowing into the recess 14c is supplied to the bearing 71 held by the bearing holding portion 14d. The other part of the oil O flowing into the recess 14c flows into the shaft 31 from the other side in the axial direction. The intra-shaft channel 92c is a path through which the oil O flowing into the shaft 31 from the end on the other side in the axial direction of the shaft 31 flows to one side in the axial direction in the shaft 31. As described above, in the present example embodiment, the oil O flows into the shaft 31 from both sides in the axial direction by the first supply flow path 91 and the second supply flow path 92. Therefore, for example, as compared with a case where the oil O flows in only from one end in the shaft 31, the oil O can be suitably flown to the entire shaft 31 in the axial direction. That is, it is possible to suppress that the oil O flowing in from one end in the shaft 31 does not reach the other end in the shaft 31 and does not flow to the entire inside of the shaft 31. Therefore, it is easy to suitably supply the oil O to each of the bearings 71 and 74 supporting both axial ends of the shaft 31. The oil O flowing through the intra-shaft channel 92c flows through the intra-rotor channel 90a and is supplied to the rotor 30 and the stator 40, similarly to the intra-shaft channel 91c.

The oil O supplied to the stator 40 takes heat from the stator 40 by the first supply flow path 91 and the second supply flow path 92. The oil O that has cooled the stator 40 falls on a lower side and accumulates in a lower region in the motor housing 11. The oil O accumulated in the lower region in the motor housing 11 returns to the inside of the transmission housing 12 via the through hole 19a of the partition wall 19 or the collection flow path 93.

As illustrated in FIG. 2, the collection flow path 93 extends from the inside of the motor housing 11 to the inside of the transmission housing 12. In the present example embodiment, the collection flow path 93 is provided across the third housing 15, the first housing 13, and the second housing 14. The collection flow path 93 is located on the lower side of the motor 20. The collection flow path 93 includes the groove portion 93a, the connection portion 93b, and the collection flow path body 93c. The groove portion 93a is provided on the inner peripheral surface of the motor housing 11. In the present example embodiment, the groove portion 93a is recessed on the lower side from a portion located on the lower side of the inner peripheral surface of the first housing 13. The groove portion 93a extends in the axial direction. The end on one side in the axial direction of the groove portion 93a is closed. The end on the other side in the axial direction of the groove portion 93a is open to the end surface on the other side in the axial direction of the peripheral wall 13b. The end on the other side in the axial direction of the groove portion 93a is connected to the connection portion 93b.

Figure 10:
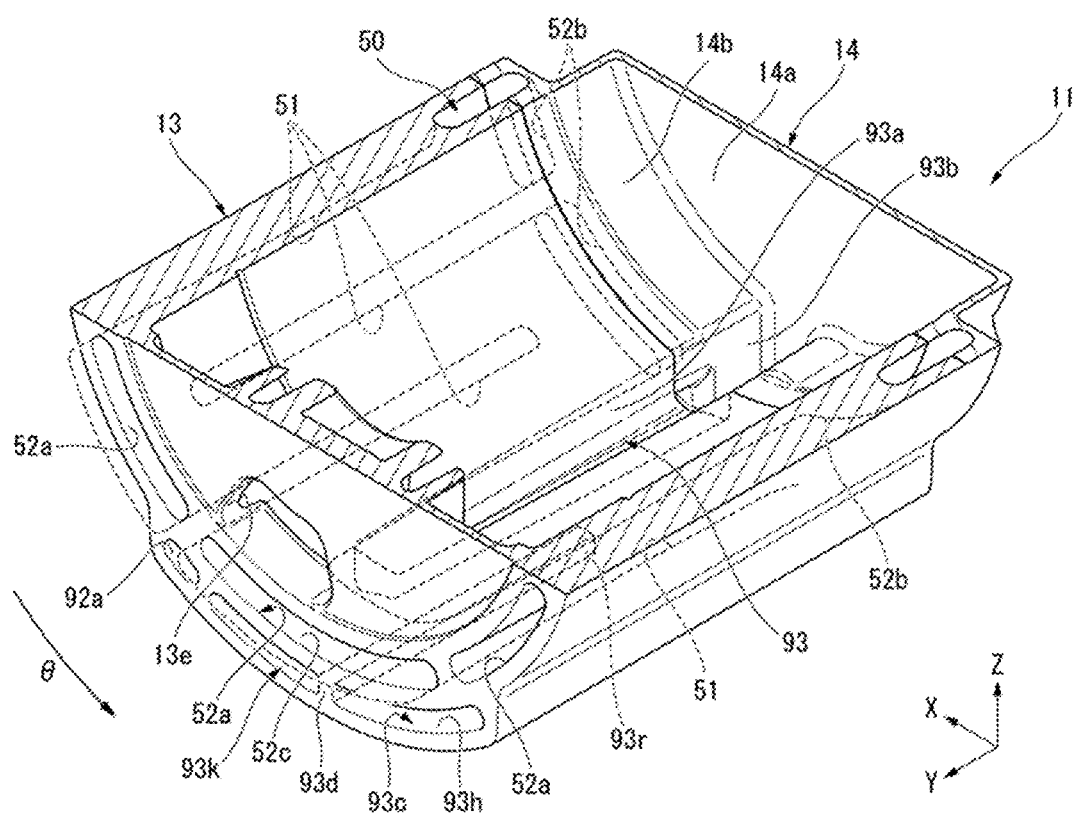
FIG. 10 is a sectional perspective view illustrating a portion of the motor housing of an example embodiment of the present invention.

The bottom of the groove portion 93a is located on the lower side toward the other side in the axial direction. That is, the bottom of the groove portion 93a is an inclined surface located on the lower side toward the connection portion 93b. Therefore, the oil O entering the groove portion 93a can be easily guided to the connection portion 93b along the bottom of the groove portion 93a using gravity. The bottom of the groove portion 93a is a surface that is located on the radially outer side of the inner surface of the groove portion 93a and faces the radially inner side. In the present example embodiment, the bottom of the groove portion 93a faces upward. As illustrated in FIG. 10, the circumferential dimension of the groove portion 93a is smaller than the circumferential dimension of the through hole 13e.

The connection portion 93b connects the groove portion 93a and the collection flow path body 93c. The connection portion 93b is connected to an end 93f on the other side in the axial direction of the groove portion 93a. In the present example embodiment, the connection portion 93b is provided on the peripheral wall 14b of the second housing 14. The connection portion 93b extends on the lower side from a portion located on the lower side of the inner peripheral surface of the peripheral wall 14b. The connection portion 93b opens upward. As illustrated in FIG. 2, the lower end of the connection portion 93b is connected to an end 93g on the other side in the axial direction of the collection flow path body 93c. As a result, the connection portion 93b connects the end 93f on the other side in the axial direction of the groove portion 93a and the end 93g on the other side in the axial direction of the collection flow path body 93c.

The collection flow path body 93c is located radially outside the groove portion 93a. In the present example embodiment, the collection flow path body 93c is located on the lower side of the groove portion 93a. The collection flow path body 93c extends in the axial direction and is connected to the inside of the transmission housing 12. An end 93p on one side in the axial direction of the collection flow path body 93c is open to the inside of the transmission housing 12. In the present example embodiment, the collection flow path body 93c is provided across the second housing 14, the first housing 13, and the third housing 15. That is, the collection flow path body 93c includes a first portion 93h provided in the first housing 13, a second portion 93i provided in the second housing 14, and a third portion 93j provided in the third housing 15. An end 93k on one side in the axial direction of the first portion 93h is connected to an end on the other side in the axial direction of the third portion 93j. An end 93m on the other side in the axial direction of the first portion 93h is connected to the end on one side in the axial direction of the second portion 93i. The collection flow path body 93c extends from the lower end of the connection portion 93b to one side in the axial direction, penetrates the first housing 13 and the third housing 15 in the axial direction, and is open to the inside of the transmission housing 12. The collection flow path body 93c is located on the lower side of the through hole 19a of the partition wall 19.

As illustrated in FIGS. 3 and 4, the cross section of the flow path of the collection flow path body 93c has a shape elongated in the circumferential direction. The circumferential dimension of the collection flow path body 93c is larger than the circumferential dimension of the groove portion 93a and the circumferential dimension of the connection portion 93b. Therefore, the flow rate of the oil O that can flow into the collection flow path body 93c can be increased. As a result, the amount of the oil O that can be returned from the inside of the motor housing 11 into the transmission housing 12 can be increased.

At least a part of the collection flow path body 93c is located radially outside the second flow path 50. As a result, at least a part of the collection flow path 93 is located radially outside the second flow path 50. As illustrated in FIG. 10, a part of the collection flow path body 93c is located on the lower side of a pair of axial flow path portions 51, which will be described later, disposed with the groove portion 93a interposed therebetween in the circumferential direction in the second flow path 50, a first circumferential flow path portion 52c, which will be described later, located on one side in the axial direction of the groove portion 93a in the second flow path 50, and a pair of second circumferential flow path portions 52b, which will be described later, disposed with the connection portion 93b interposed therebetween in the circumferential direction in the second flow path 50. In the present example embodiment, since the circumferential dimension of the collection flow path body 93c is larger than the circumferential dimension of the groove portion 93a and the circumferential dimension of the connection portion 93b as described above, the collection flow path body 93c can protrude in the circumferential direction from the groove portion 93a and the connection portion 93b. Therefore, the collection flow path body 93c can be easily disposed radially outside the second flow path 50.

The collection flow path body 93c is disposed adjacent to one circumferential direction side (+θ side) of the introduction flow path portion 92a. That is, in the present example embodiment, the introduction flow path portion 92a is disposed adjacent to the collection flow path 93 in the circumferential direction. In the present example embodiment, the portion of the motor housing 11 where the collection flow path body 93c and the introduction flow path portion 92a are provided protrudes on the lower side from the other portion of the motor housing 11.

The collection flow path body 93c is provided with a partition wall 93d that partitions the inside of the collection flow path body 93c in the circumferential direction. The partition wall 93d extends in the axial direction from the end 93p on one side in the axial direction of the first portion 93h toward the other side in the axial direction. In the present example embodiment, the partition wall 93d extends from the end 93k on one side in the axial direction of the first portion 93h to the central portion in the axial direction of the first portion 93h. In other words, the partition wall 93d extends from the end on one side in the axial direction of the first housing 13 to the central portion in the axial direction of the first housing 13. The partition wall 93d divides the collection flow path body 93c, which is long in the circumferential direction, into substantially two equal parts in the circumferential direction. The partition wall 93d can improve the strength of the portion of the housing 10 where the collection flow path body 93c is provided. Further, the axial force of the bolt 10b can be more suitably transmitted to the first housing 13 and the third housing 15.

The partition wall 93d may not extend to the axial center of the first portion 93h, that is, the axial center of the first housing 13. For example, an end 93r on the other side in the axial direction of the partition wall 93d may be disposed at any position as long as it is located on the other side in the axial direction with respect to the end 93k on one side in the axial direction of the first portion 93h and located on one side in the axial direction with respect to the end 93m on the other side in the axial direction of the first portion 93h.

As illustrated in FIG. 3, the collection flow path body 93c has a recessed portion 93e recessed radially inward. The recessed portion 93e is located at the circumferential central portion of the other side in the axial direction of the collection flow path body 93c. An outer peripheral surface of a portion of the motor housing 11 where the recessed portion 93e is provided is recessed radially inward. Thus, for example, the bolt 10b for fixing the first housing 13 and the third housing 15 can be prevented from interfering with the collection flow path body 93c.

Figure 11:
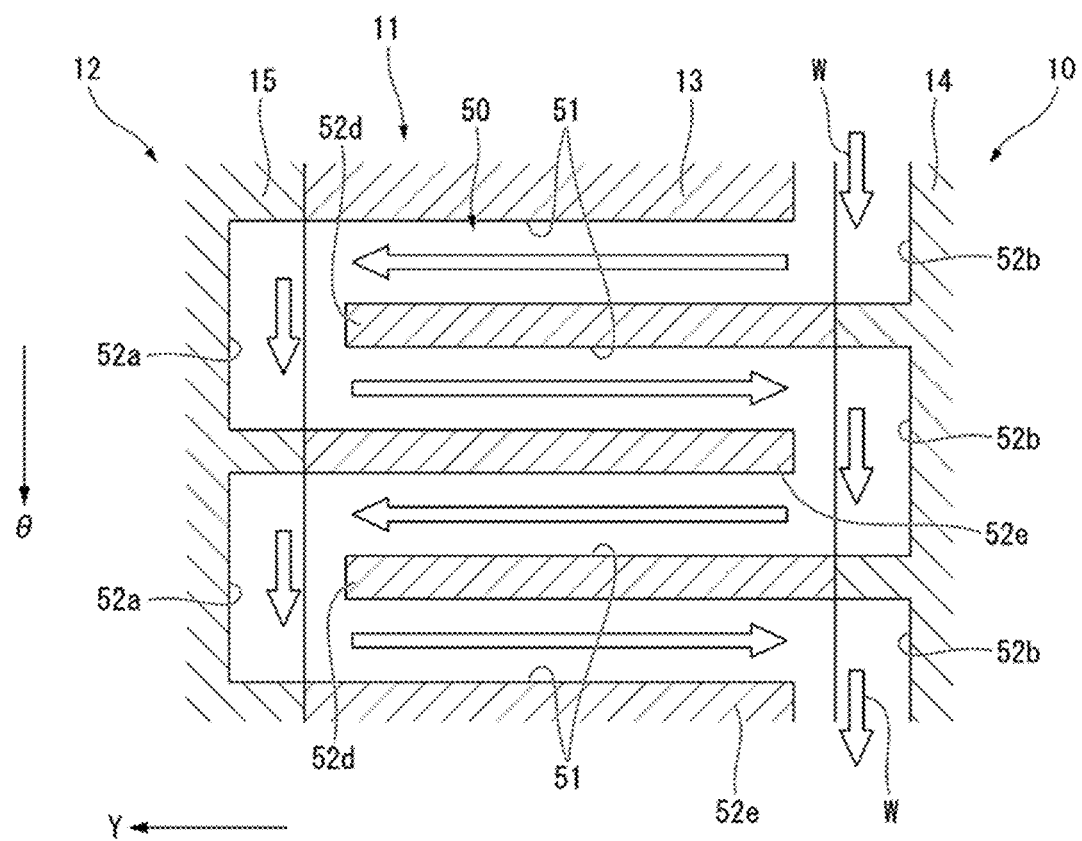
FIG. 11 is a sectional view illustrating a portion of the second flow path of an example embodiment of the present invention.

As illustrated in FIGS. 1 and 2, at least a part of the second flow path 50 is located radially outside the motor 20. In the present example embodiment, substantially the entire second flow path 50 except for both axial ends is located radially outside the motor 20. A portion of the second flow path 50 located on the lower side is located between the collection flow path body 93c and the motor 20 in the radial direction. As illustrated in FIGS. 10 and 11, in the present example embodiment, the second flow path 50 extends in a rectangular wave shape along the circumferential direction. The second flow path 50 includes a plurality of axial flow path portions 51, a plurality of first circumferential flow path portions 52a, and a plurality of second circumferential flow path portions 52b.

The plurality of axial flow path portions 51 extend in the axial direction. The plurality of axial flow path portions 51 are arranged at intervals in the circumferential direction. In the present example embodiment, the axial flow path portion 51 is provided in the motor housing 11. More specifically, the axial flow path portion 51 is provided in the first housing 13. As illustrated in FIG. 10, the two axial flow path portions 51 located on the lower side among the plurality of axial flow path portions 51 are disposed with the groove portion 93a interposed therebetween in the circumferential direction.

As illustrated in FIG. 1, the plurality of axial flow path portions 51 include an axial flow path portion 51c divided into two in the axial direction by a partition wall 51d. The axial flow path portion 51c includes an upstream flow path portion 51a and a downstream flow path portion 51b. In the present example embodiment, the upstream flow path portion 51a is a portion of the axial flow path portion 51c located on one side in the axial direction with respect to the partition wall 51d. In the present example embodiment, the downstream flow path portion 51b is a portion of the axial flow path portion 51c located on the other side in the axial direction with respect to the partition wall 51d.

As illustrated in FIG. 10, the first circumferential flow path portion 52a and the second circumferential flow path portion 52b extend in the circumferential direction. The plurality of first circumferential flow path portions 52a are arranged at intervals in the circumferential direction. The plurality of second circumferential flow path portions 52b are arranged at intervals in the circumferential direction. The first circumferential flow path portion 52a connects the ends on one side in the axial direction of the axial flow path portions 51 adjacent to each other in the circumferential direction. The second circumferential flow path portion 52b connects the ends on the other side in the axial direction of the axial flow path portions 51 adjacent to each other in the circumferential direction. The ends on both sides in the axial direction of the axial flow path portion 51 are alternately connected by the first circumferential flow path portion 52a and the second circumferential flow path portion 52b, so that the second flow path 50 has a rectangular wave shape.

The plurality of first circumferential flow path portions 52a include the first circumferential flow path portion 52c circumferentially across one side in the axial direction of the groove portion 93a. The first circumferential flow path portion 52c is the first circumferential flow path portion 52a located on the lowermost side among the plurality of first circumferential flow path portions 52a. The circumferential dimension of the first circumferential flow path portion 52c is larger than the circumferential dimension of the other first circumferential flow path portions 52a. The through hole 13e is located above the other circumferential side (−θ side) portion of the first circumferential flow path portion 52c.

The plurality of second circumferential flow path portions 52b include a pair of second circumferential flow path portions 52b that circumferentially sandwich the end on the other side in the axial direction of the groove portion 93a and the connection portion 93b. That is, in the present example embodiment, the end on the other side in the axial direction of the groove portion 93a and the connection portion 93b are located between the second circumferential flow path portions 52b adjacent to each other in the circumferential direction.

As illustrated in FIG. 11, in the present example embodiment, the first circumferential flow path portion 52a is provided across the motor housing 11 and the transmission housing 12. More specifically, the first circumferential flow path portion 52a is provided across the first housing 13 and the third housing 15. The first circumferential flow path portion 52a is configured by axially connecting a portion provided on the end surface on one side in the axial direction of the first housing 13 and a groove recessed from the end surface on the other side in the axial direction of the third housing 15 to one side in the axial direction.

In the present example embodiment, the second circumferential flow path portion 52b is provided across the first housing 13 and the second housing 14. That is, the second flow path 50 in the present example embodiment is provided across the first housing 13 and the second housing 14. The second circumferential flow path portion 52b is configured by axially connecting a portion provided on the end surface on the other side in the axial direction of the first housing 13 and a groove recessed from the end surface on one side in the axial direction of the second housing 14 to the other side in the axial direction.

An end on one side in the axial direction of a partition wall 52d that partitions the pair of axial flow path portions 51 connected by the first circumferential flow path portion 52a in the circumferential direction is disposed away from an end surface on one side in the axial direction of the first housing 13 on the other side in the axial direction. The end on the other side in the axial direction of a partition wall 52e that partitions the pair of axial flow path portions 51 connected by the second circumferential flow path portion 52b in the circumferential direction is disposed away from the end surface on the other side in the axial direction of the first housing 13 on one side in the axial direction.

In the axial flow path portion 51, the water W flows in the axial direction. The directions in which the water W flows in the axial flow path portions 51 adjacent to each other in the circumferential direction are opposite to each other. In the first circumferential flow path portion 52a and the second circumferential flow path portion 52b, the water W flows in one circumferential direction (−θ direction). The first circumferential flow path portion 52a connects an end on one side in the axial direction of the axial flow path portion 51 through which the water W flows in the direction toward one side in the axial direction and an end on one side in the axial direction of the axial flow path portion 51 through which the water W flows toward the other side in the axial direction. The second circumferential flow path portion 52b connects the end on the other side in the axial direction of the axial flow path portion 51 through which the water W flows in the direction toward the other side in the axial direction and the end on the other side in the axial direction of the axial flow path portion 51 through which the water W flows in the direction toward the one side in the axial direction.

As illustrated in FIG. 1, the second flow path 50 includes an inflow flow path portion 53a and an outflow flow path portion 53b. In the present example embodiment, the inflow flow path portion 53a and the outflow flow path portion 53b pass through the inside of the inverter unit 80. The water W flows into the inflow flow path portion 53a from the outside of drive device 100. The water W flowing into the inflow flow path portion 53a flows into the upstream flow path portion 51a. The water W flowing into the upstream flow path portion 51a flows around the motor 20 while flowing along a rectangular wave-shaped flow path configured by the axial flow path portion 51, the first circumferential flow path portion 52a, and the second circumferential flow path portion 52b, and flows into the outflow flow path portion 53b from the downstream flow path portion 51b. The water W flowing into the outflow flow path portion 53b flows out of the drive device 100.

As illustrated in FIG. 2, the housing 10 includes an oil supply path 95. The oil supply path 95 extends from the inside of the transmission housing 12 to penetrate the second facing wall 15a in the axial direction. In the present example embodiment, the oil supply path 95 penetrates the first facing wall 13a in the axial direction and extends to the inside of the motor housing 11. As illustrated in FIG. 5, the oil supply path 95 has a supply port 13h for supplying the oil O to the bearing 72 held by the bearing holding portion 13c. In the present example embodiment, the supply port 13h is an opening that opens in the surface of the first hole 13g on the other side in the axial direction of the first facing wall 13a. The supply port 13h is open to the inside of the motor housing 11. As illustrated in FIG. 3, the supply port 13h is located above the central axis J1. The supply port 13h is open to the inside of the penetration portion 13f. When viewed in the axial direction, the supply port 13h overlaps the penetration portion 13f.

In the present example embodiment, the oil supply path 95 includes the first hole 13g, the second hole 15g, the first gutter portion 17, and the second gutter portion 18. As indicated by a broken arrow in FIG. 5, a part of the oil O that has been scraped up by the ring gear 62a and entered the second gutter portion 18 passes through the second hole 15g and flows into the first gutter portion 17 in the space S. The oil O flowing into the first gutter portion 17 flows in the first gutter portion 17, passes through the first hole 13g, and is supplied from the supply port 13h into the motor housing 11. The oil O discharged from the supply port 13h flows into the bearing holding portion 13c via the penetration portion 13f and is supplied to the bearing 72.

According to the present example embodiment, at least a part of the second flow path 50 is located radially outside the motor 20. Therefore, the motor 20 can be cooled by the water W flowing in the second flow path 50. In the present example embodiment, the stator 40 can be cooled by the water W flowing in the second flow path 50. At least a part of the collection flow path 93 is located radially outside the second flow path 50. Therefore, the collection flow path 93 can be disposed close to the second flow path 50. As a result, the oil O passing through the collection flow path 93 can be easily cooled by the water W flowing in the second flow path 50. Therefore, the temperature of the oil O flowing into the transmission housing 12 from the collection flow path 93 can be lowered. Therefore, the temperature of the oil O supplied from the inside of the transmission housing 12 to the inside of the motor housing 11 by the first supply flow path 91 and the second supply flow path 92 can be made relatively low. As a result, the relatively low-temperature oil O can be supplied to the motor 20 accommodated in the motor housing 11. Therefore, the motor 20 can be suitably cooled by the relatively low-temperature oil O. As described above, in the present example embodiment, the motor 20 can be suitably cooled by the water W and the oil O. Therefore, the cooling efficiency of the motor 20 can be improved. In addition, it is possible to easily cool the motor 20 without providing a cooler such as an oil cooler in order to cool the oil O. Therefore, the number of components of the drive device 100 can be reduced by the absence of the cooler.

According to the present example embodiment, the second flow path 50 extends in a rectangular wave shape along the circumferential direction. Therefore, the portion of the housing 10 where the second flow path 50 is provided can be widened, and the motor 20 can be more suitably cooled by the water W flowing in the second flow path 50. Therefore, the cooling efficiency of the motor 20 can be further improved. In addition, in a case where the housing 10 is divided into a plurality of members as in the present example embodiment, the second flow path 50 is easily formed by using each member constituting the housing 10 for constituting the second flow path 50. Specifically, in the present example embodiment, the second flow path 50 can be easily formed by providing the hole axially penetrating the first housing 13 and closing both axial sides of the hole with the second housing 14 and the third housing 15.

According to the present example embodiment, the first circumferential flow path portion 52a is provided across the first housing 13 and the third housing 15. Therefore, for example, as compared with a case where the entire first circumferential flow path portion 52a is provided in the third housing 15, it is possible to suppress an increase in size of the third housing 15 in the axial direction. Thus, the drive device 100 can be prevented from increasing in size in the radial direction. In addition, since the second flow path 50 can be suitably extended to one side in the axial direction from the stator 40, the range of the stator 40 that can be cooled by the second flow path 50 can be widened. As a result, the motor 20 can be more suitably cooled by the water W flowing in the second flow path 50.

According to the present example embodiment, the collection flow path 93 includes the groove portion 93a provided on the inner peripheral surface of the motor housing 11 and extending in the axial direction, the collection flow path body 93c located radially outside the groove portion 93a and extending in the axial direction and connected to the inside of the transmission housing 12, and the connection portion 93b connecting the groove portion 93a and the collection flow path body 93c. Therefore, at least a part of the oil O supplied into the motor housing 11 by the first supply flow path 91 and the second supply flow path 92 can flow into the collection flow path 93 from the groove portion 93a. Further, the oil O flowing into the groove portion 93a can be sent into the transmission housing 12 via the connection portion 93b and the collection flow path body 93c. As a result, the oil O in the motor housing 11 can be easily returned into the transmission housing 12 by the collection flow path 93. According to the present example embodiment, at least a part of the collection flow path body 93c is located radially outside the second flow path 50. Therefore, the oil O flowing in the collection flow path body 93c can be easily cooled by the water W flowing in the second flow path 50.

According to the present example embodiment, the connection portion 93b connects the end on the other side in the axial direction of the groove portion 93a and the end on the other side in the axial direction of the collection flow path body 93c. That is, the position where the groove portion 93a and the collection flow path body 93c are connected by the connection portion 93b can be set to a position relatively distant from the transmission housing 12 in the axial direction. Therefore, it is possible to increase the distance by which the oil O flows from the connection portion 93b into the collection flow path body 93c and reaches the inside of the transmission housing 12. As a result, it is possible to extend the time during which the oil O flowing in the collection flow path body 93c can be cooled by the water W flowing in the second flow path 50. Therefore, the oil O flowing in the collection flow path body 93c can be suitably cooled by the water W flowing in the second flow path 50. Therefore, the lower temperature oil O can be easily supplied to the motor 20. As a result, the cooling efficiency of the motor 20 can be further improved.

According to the present example embodiment, the plurality of first circumferential flow path portions 52a include the first circumferential flow path portion 52c circumferentially across one side in the axial direction of the groove portion 93a. The connection portion 93b is located between the second circumferential flow path portions 52b adjacent to each other in the circumferential direction. As described above, the first circumferential flow path portion 52c straddles the groove portion 93a on the side opposite to the side where the connection portion 93b is provided in the axial direction, so that the connection portion 93b can be extended from the radially inner side of the second flow path 50 to the radially outer side of the second flow path 50 without interfering with the second flow path 50. As a result, at least a part of the collection flow path body 93c can be disposed radially outside the second flow path 50 without interfering with the second flow path 50.

According to the present example embodiment, the second supply flow path 92 has the introduction flow path portion 92a extending in the axial direction from the inside of the transmission housing 12. At least a part of the introduction flow path portion 92a is located radially outside the second flow path 50. Therefore, the introduction flow path portion 92a can be disposed close to the second flow path 50. Thus, the oil O passing through the introduction flow path portion 92a can be easily cooled by the water W flowing in the second flow path 50. Therefore, the temperature of the oil O supplied to the inside of the motor housing 11 by the second supply flow path 92 can be made relatively low. Therefore, the motor 20 accommodated in the motor housing 11 can be more suitably cooled by the oil O. Therefore, the cooling efficiency of the motor 20 can be further improved.

According to the present example embodiment, the introduction flow path portion 92*a* is disposed adjacent to the collection flow path 93 in the circumferential direction. Therefore, the introduction flow path portion 92*a* and the collection flow path 93 can be collectively disposed. This can suppress complication of the structure of the housing 10.

According to the present example embodiment, the collection flow path 93 and the second flow path 50 are provided across the first housing 13 and the second housing 14, respectively. Therefore, the collection flow path 93 and the second flow path 50 can be enlarged in the axial direction. As a result, it is easy to increase the number of portions of the collection flow path 93 disposed close to the second flow path 50. Therefore, the oil O flowing in the collection flow path 93 can be more easily cooled by the water W flowing in the second flow path 50. In addition, since the second flow path 50 can be enlarged in the axial direction, the range of the motor 20 that can be cooled by the water W flowing in the second flow path 50 can be widened in the axial direction. As a result, the entire stator core 41 and the coil ends 42*a* and 42*b* protruding from the stator core 41 to both sides in the axial direction can be easily cooled by the water W flowing in the second flow path 50. As described above, the cooling efficiency of the motor 20 can be further improved.

According to the present example embodiment, the first housing 13 and the second housing 14 are fixed to each other at positions radially inside the collection flow path 93 and adjacent to the second flow path 50 in the circumferential direction. In the present example embodiment, the first housing 13 and the second housing 14 are fixed to each other at the positions by the bolt 10*d* tightened into the female screw hole 13*i*. As a result, the first housing 13 and the second housing 14 can be fixed at positions close to both the collection flow path 93 and the second flow path 50. Therefore, it is possible to prevent portions of the first housing 13 and the second housing 14 constituting the collection flow path 93 from being separated from each other. In addition, it is possible to prevent portions of the first housing 13 and the second housing 14 constituting the second flow paths 50 from being separated from each other. This can suppress leakage of the oil O from the collection flow path 93 and leakage of the water W from the second flow path 50. Further, it is possible to prevent the oil O leaking from the collection flow path 93 from entering the second flow path 50 and mixing with the water W. In addition, it is possible to suppress the water W leaking from the second flow path 50 from entering the collection flow path 93 and mixing with the oil O.

According to the present example embodiment, the partition wall 19 has the through hole 19*a* connecting the inside of the motor housing 11 and the inside of the transmission housing 12. Therefore, the oil O supplied into the motor housing 11 can be returned into the transmission housing 12 from the through hole 19*a* in addition to the collection flow path 93. As a result, the amount of the oil O returned from the motor housing 11 into the transmission housing 12 can be increased.

For example, when the housing 10 is configured by two separate members constituting the motor housing 11 and two separate members constituting the transmission housing 12 as in the present example embodiment, the motor housing 11 and the transmission housing 12 are provided separately. In such a case, conventionally, the motor housing 11 and the transmission housing 12 are provided with structures for lubricating the bearings separately. Therefore, there is a problem that the manufacturing cost of the drive device 100 increases due to a complicated structure of the housing 10 or the use of a relatively expensive bearing that does not require the supply of lubricating oil. The relatively expensive bearing requiring no supply of lubricating oil is, for example, a bearing provided with semi-solid grease.

On the other hand, according to the present example embodiment, the housing 10 has the oil supply path 95 extending axially through the second facing wall 15*a* from the inside of the transmission housing 12. The oil supply path 95 has the supply port 13*h* for supplying the oil O to the bearing 72 held by the first facing wall 13*a* of the motor housing 11. The supply port 13*h* is located above the central axis J1. Therefore, the oil O discharged from the supply port 13*h* can be dropped by gravity and supplied to the bearing 72 provided in the motor housing 11 among the bearings supporting the rotor 30 rotatable about the central axis J1. That is, a part of the oil O in the transmission housing 12 can be supplied to the bearing 72 provided in the motor housing 11 by the oil supply path 95. In this manner, the bearing 72 provided in the motor housing 11 can be lubricated using the bearing lubrication structure provided in the transmission housing 12. That is, in the drive device 100, the bearing 72 provided in the motor housing 11 can be lubricated using the oil O in the transmission housing 12 while the motor housing 11 and the transmission housing 12 are configured to be separable. Therefore, it is possible to suppress complication of the structure of the housing 10, and it is not necessary to use a bearing that does not require supply of lubricating oil as the bearing 72. Therefore, it is possible to suppress an increase in manufacturing cost of the drive device 100.

According to the present example embodiment, the bearing holding portion 13*c* is provided on the surface on the other side in the axial direction of the first facing wall 13*a*. The oil supply path 95 penetrates the first facing wall 13*a* in the axial direction and extends to the inside of the motor housing 11. The supply port 13*h* is open to the inside of the motor housing 11. Therefore, even when the bearing 72 held by the bearing holding portion 13*c* is located inside the motor housing 11, the oil O can be supplied to the bearing 72 by the oil supply path 95.

Further, according to the present example embodiment, the bearing holding portion 13*c* has the penetration portion 13*f* that penetrates the bearing holding portion 13*c* in the radial direction. The supply port 13*h* is open to the inside of the penetration portion 13*f*. Therefore, the oil O discharged from the supply port 13*h* is easily supplied from the penetration portion 13*f* to the inside of the bearing holding portion 13*c*. As a result, the oil O can be more easily supplied to the bearing 72.

According to the present example embodiment, the oil supply path 95 includes the first hole 13*g* axially penetrating the first facing wall 13*a*, the second hole 15*g* axially penetrating the second facing wall 15*a*, and the first gutter portion 17 located between the first facing wall 13*a* and the second facing wall 15*a* in the axial direction and connecting the first facing wall 13*a* and the second facing wall 15*a*. The first gutter portion 17 is connected to a portion located on the lower side of the first hole 13*g* in the surface on one side in the axial direction of the first facing wall 13*a* and a portion located on the lower side of the second hole 15*g* in the surface on the other side in the axial direction of the second facing wall 15*a*. Therefore, the oil O in the transmission housing 12 can be supplied into the motor housing 11 through the second hole 15*g*, the first gutter portion 17, and the first hole 13g in this order. As a result, the oil O in the transmission housing 12 can be more suitably supplied to the bearing 72 in the motor housing 11.

According to the present example embodiment, the oil supply path 95 includes the second gutter portion 18 located inside the transmission housing 12. The second gutter portion 18 is connected to a portion located below the second hole 15g in the surface on one side in the axial direction of the second facing wall 15a. Therefore, for example, a part of the oil O scattered in the transmission housing 12 by being scraped up by the ring gear 62a can be received by the second gutter portion 18. In addition, at least a part of the oil O received by the second gutter portion 18 can flow into the second hole 15g. As a result, the oil O in the transmission housing 12 can be more suitably supplied to the bearing 72 in the motor housing 11 through the second hole 15g, the first gutter portion 17, and the first hole 13g in this order.

In addition, according to the present example embodiment, the second facing wall 15a has the through hole 15h connecting the space S located between the first facing wall 13a and the second facing wall 15a in the axial direction and the inside of the transmission housing 12. Therefore, for example, the oil O leaking from the inside of the first gutter portion 17 can be returned into the transmission housing 12 through the through hole 15h. Thus, the oil O can be prevented from accumulating in the space S.

According to the present example embodiment, the first facing wall 13a has the through hole 13e connecting the space S located between the first facing wall 13a and the second facing wall 15a in the axial direction and the inside of the motor housing 11. Therefore, the inside of the motor housing 11 and the inside of the transmission housing 12 can be connected by the through hole 13e, the space S, and the through hole 15h. As a result, the above-described through hole 19a is formed, and at least a part of the oil O supplied into the motor housing 11 can be returned into the transmission housing 12.

The present disclosure is not limited to the above-described example embodiment, and other structures and other methods may be employed within the scope of the technical idea of the present disclosure. The first flow path may have any configuration as long as the second flow path includes the supply flow path and the collection flow path. In the above-described example embodiment, the first supply flow path 91 and the second supply flow path 92 are provided as the supply flow path, but the present disclosure is not limited thereto. As the supply flow path, only one of the first supply flow path 91 and the second supply flow path 92 may be provided.

The collection flow path extending from the inside of the motor housing to the inside of the transmission housing may have any configuration as long as at least a part thereof is located radially outside the second flow path. When the motor housing has the first housing and the second housing, the collection flow path may be provided only in the first housing in the motor housing. The shape and size of the groove, the shape and size of the connection portion, and the shape and size of the collection flow path body are not particularly limited. The groove and the connection portion may not be provided.

The second flow path may have any shape. The first circumferential flow path portion may not be provided across the first housing and the third housing. The second circumferential flow path portion may not be provided across the first housing and the second housing. For example, the second flow path may extend in a rectangular wave shape along the axial direction by connecting axial ends of a plurality of flow path portions extending in the circumferential direction and arranged at intervals in the axial direction. The second flow path may extend spirally.

The type of the first fluid flowing into the first flow path and the type of the second fluid flowing into the second flow path are not particularly limited. The first fluid and the second fluid may be the same type of fluid. The first fluid may be an insulating liquid or water. When the first fluid is water, the surface of the stator may be subjected to an insulation treatment. The second fluid may be oil.

The oil supply path extending from the inside of the transmission housing through the second facing wall in the axial direction may have any configuration as long as the oil supply passage has a supply port that is located above the central axis and supplies oil to the bearing. When the bearing holding portion provided on the first facing wall of the motor housing is provided on the surface on one side in the axial direction of the first facing wall, that is, the surface of the first facing wall facing the transmission housing side, the oil supply path may penetrate only the second facing wall and may not penetrate the first facing wall. In this case, for example, the supply port of the oil supply path is open to the space between the first facing wall and the second facing wall. The oil supply path may not have at least one of the first hole, the second hole, the first gutter portion, and the second gutter portion. The oil supply path may be formed of, for example, a tubular member such as a pipe. The oil supply path may not be provided.

The number of housings constituting the housing is not particularly limited. The housing may be configured such that two housings are fixed to each other, three housings are fixed to each other, or five or more housings are fixed to each other. The housing constituting the housing may include a housing having a part of the motor housing and a part of the transmission housing.

The application of the drive device to which the present disclosure is applied is not particularly limited. For example, the drive device may be mounted on a vehicle for a purpose other than the purpose of rotating the axle, or may be mounted on a device other than the vehicle. The posture when the drive device is used is not particularly limited. The central axis of the motor may be inclined with respect to the horizontal direction orthogonal to the vertical direction or may extend in the vertical direction. Features as described above in the present specification may be combined appropriately as long as no conflict arises.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A drive device, comprising:
 a motor including a rotor rotatable about a central axis;
 a transmission connected to the motor; and
 a housing including a motor housing accommodating the motor therein and a transmission housing accommodating the transmission therein; wherein
 a first fluid is accommodated in the transmission housing;
 the housing includes:
  a first flow path through which the first fluid flows; and
  a second flow path through which a second fluid flows;

the first flow path includes:
- a supply flow path that supplies the first fluid in the transmission housing to an inside of the motor housing; and
- a collection flow path extending from the inside of the motor housing to an inside of the transmission housing;

at least a portion of the second flow path is located radially outside the motor;

at least a portion of the collection flow path is located radially outside the second flow path; and at least a portion of the first flow path overlaps a portion of the second flow path within a peripheral wall of the motor housing when viewed along a radial direction.

2. The drive device according to claim 1, wherein the second flow path includes:
- a plurality of axial flow path portions extending in an axial direction and arranged at intervals in a circumferential direction;
- a plurality of first circumferential flow path portions connecting ends on one side in an axial direction of the axial flow path portions adjacent to each other in a circumferential direction; and
- a plurality of second circumferential flow path portions connecting ends on another side in the axial direction of the axial flow path portions adjacent to each other in the circumferential direction, extends in a rectangular wave shape along the circumferential direction.

3. The drive device according to claim 2, wherein the motor housing and the transmission housing are separate bodies fixed to each other;
the motor housing includes:
- a first housing fixed to the transmission housing; and
- a second housing fixed to a side of the first housing in the axial direction;

the transmission housing includes:
- a third housing fixed to the first housing; and
  - a fourth housing fixed to a side of the third housing in the axial direction which is opposite to the side of the first housing in the axial direction;

the axial flow path portion is provided in the first housing; and the first circumferential flow path portion is provided across the first housing and the third housing.

4. The drive device according to claim 2, wherein the collection flow path includes:
- a groove portion provided on an inner peripheral surface of the motor housing and extending in an axial direction;
- a collection flow path body located radially outside the groove portion, extending in the axial direction, and connected to the inside of the transmission housing; and
- a connection portion connecting the groove portion and the collection flow path body portion to each other; and at least a portion of the collection flow path body is located radially outside the second flow path.

5. The drive device according to claim 4, wherein the transmission housing is connected to one side of the motor housing in the axial direction; and the connection portion connects an end of the groove portion on a side in the axial direction opposite to the one side of the motor housing and an end of the collection flow path body on the side in the axial direction opposite to the one side of the motor housing.

6. The drive device according to claim 5, wherein the plurality of first circumferential flow path portions include a first circumferential flow path portion extending over one side in the axial direction of the groove portion in the circumferential direction; and the connection portion is located between the second circumferential flow path portions adjacent to each other in the circumferential direction.

7. The drive device according to claim 4, wherein the central axis extends in a direction intersecting the vertical direction;

the collection flow path is located on a vertically lower side of the motor; and a bottom of the groove portion is an inclined surface located on a vertically lower side toward the connection portion.

8. The drive device according to claim 4, wherein a circumferential dimension of the collection flow path body is larger than a circumferential dimension of the connection portion.

9. The drive device according to claim 1, wherein the collection flow path includes:
- a groove portion provided on an inner peripheral surface of the motor housing and extending in an axial direction;
- a collection flow path body located radially outside the groove portion, extending in the axial direction, and connected to the inside of the transmission housing; and
- a connection portion which connects the groove portion and the collection flow path body portion to each other; and at least a portion of the collection flow path body is located radially outside the second flow path.

10. The drive device according to claim 1, wherein the supply flow path includes an introduction flow path portion extending in the axial direction from the inside of the transmission housing; and at least a portion of the introduction flow path portion is located radially outside the second flow path.

11. The drive device according to claim 10, wherein the introduction flow path portion is adjacent to the collection flow path in the circumferential direction.

12. The drive device according to claim 1, wherein the motor housing includes:
- a cylindrical first housing surrounding the motor on a radially outer side of the motor; and
- a second housing that is separate from the first housing and is fixed to a side of the first housing in the axial direction; and the collection flow path and the second flow path are provided across the first housing and the second housing, respectively.

13. The drive device according to claim 12, wherein the first housing and the second housing are fixed to each other at positions radially inside the collection flow path and adjacent to the second flow path in the circumferential direction.

14. The drive device according to claim 1, wherein the housing includes a partition wall separating an inside of the motor housing and an inside of the transmission housing; and the partition wall includes a through hole connecting the inside of the motor housing and the inside of the transmission housing.

* * * * *